United States Patent
Tang et al.

(10) Patent No.: US 12,556,349 B2
(45) Date of Patent: Feb. 17, 2026

(54) APPARATUSES AND METHODS FOR FLEXIBLE SPECTRUM

(71) Applicant: HUAWEI TECHNOLOGIES CO., LTD., Guangdong (CN)

(72) Inventors: Hao Tang, Guangdong (CN); Jianglei Ma, Kanata (CA); Xiaoyan Bi, Guangdong (CN); Peiying Zhu, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 342 days.

(21) Appl. No.: 18/314,454

(22) Filed: May 9, 2023

(65) Prior Publication Data
US 2023/0275738 A1    Aug. 31, 2023

Related U.S. Application Data

(63) Continuation of application No. PCT/CN2020/138873, filed on Dec. 24, 2020.

(51) Int. Cl.
H04L 5/00 (2006.01)

(52) U.S. Cl.
CPC .......... H04L 5/0098 (2013.01); H04L 5/0048 (2013.01); H04L 5/006 (2013.01); H04L 5/0092 (2013.01); H04L 5/0035 (2013.01)

(58) Field of Classification Search
None
See application file for complete search history.

(56) References Cited

U.S. PATENT DOCUMENTS

| | | | |
|---|---|---|---|
| 11,197,334 B2* | 12/2021 | Yi | H04W 76/15 |
| 2013/0016639 A1 | 1/2013 | Xu et al. | |
| 2015/0230230 A1 | 8/2015 | Kim et al. | |
| 2017/0086172 A1 | 3/2017 | Dinan | |
| 2019/0124558 A1 | 4/2019 | Ang et al. | |
| 2019/0372726 A1 | 12/2019 | Liu et al. | |

(Continued)

FOREIGN PATENT DOCUMENTS

| | | |
|---|---|---|
| CN | 105790911 A | 7/2016 |
| CN | 110831177 A | 2/2020 |

OTHER PUBLICATIONS

Ericsson et al., "Activation and deactivation of component carriers," 3GPP TSG-RAN WG2 #67-bis Tdoc R2-095808, Oct. 12-16, 2009, 3 pages.

(Continued)

*Primary Examiner* — Phirin Sam
(74) *Attorney, Agent, or Firm* — Slater Matsil, LLP

(57) ABSTRACT

Restrictions associated with the use of multiple carriers in long-term evolution (LTE) and/or new radio (NR) may impede implementing a flexible personalized spectrum for different user equipments (UEs). Apparatuses, devices, and methods are instead provided in which there is more flexible spectrum utilization, e.g. in which there may be fewer restrictions and more options for configuring carriers and/or bandwidth parts (BWPs) on a UE-specific basis. As one example, there may be a plurality of uplink and/or downlink carriers, with signaling indicating addition, modification, release, activation, deactivation, and/or scheduling of a particular carrier of the uplink carriers and/or downlink carriers, e.g. on an independent carrier-by-carrier basis.

20 Claims, 18 Drawing Sheets

(56) References Cited

U.S. PATENT DOCUMENTS

| | | | |
|---|---|---|---|
| 2020/0178195 A1* | 6/2020 | Dinan | H04W 72/23 |
| 2021/0127422 A1* | 4/2021 | Jiang | H04L 5/0055 |
| 2021/0360594 A1* | 11/2021 | Park | H04L 5/0048 |
| 2022/0132559 A1* | 4/2022 | Shi | H04L 5/0053 |
| 2023/0023231 A1* | 1/2023 | Chae | H04W 72/0453 |
| 2024/0023119 A1* | 1/2024 | Kim | H04W 48/14 |

OTHER PUBLICATIONS

ETRI, "Explicit carrier activation/deactivation", 3GPP TSG RAN WG2 #68bis R2-100148, Jan. 18-22, 2010, 3 pages.

* cited by examiner

APPARATUSES AND METHODS FOR FLEXIBLE SPECTRUM

CROSS-REFERENCE TO RELATED APPLICATION

The present application is a continuation of PCT International Application PCT/CN2020/138873, titled "Apparatuses and Methods for Flexible Spectrum", filed on Dec. 24, 2020, and incorporated herein by reference.

FIELD

The present application relates to wireless communication, and more specifically to wireless communication on multiple carriers and/or bandwidth parts (BWPs).

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources, typically referred to as "time-frequency resources".

Two devices that wirelessly communicate with each other over time-frequency resources need not necessarily be a UE and a base station. For example, two UEs may wirelessly communicate with each other over a sidelink using device-to-device (D2D) communication. As another example, two network devices (e.g. a terrestrial base station and a non-terrestrial base station, such as a drone) may wirelessly communicate with each other over a backhaul link.

When devices wirelessly communicate with each other, the wireless communication may be performed over a spectrum of frequencies occupying a bandwidth. A wireless communication may be transmitted on a carrier frequency. A carrier frequency will be referred to as a carrier. A carrier may alternatively be called a component carrier (CC). A carrier may be characterized by its bandwidth and a reference frequency, e.g. the center or lowest or highest frequency of the carrier.

Different mechanisms are currently available in long-term evolution (LTE) and/or new radio (NR) to try to increase the bandwidth for the wireless communication, e.g. to allow for more throughput. As one example, carrier aggregation (CA) may be implemented in which multiple carriers are assigned to the same UE. Time-frequency resources may be allocated for communicating on any of the carriers. As another example, dual connectivity (DC) may be implemented. The UE may simultaneously transmit and receive data on multiple carriers from two cell groups via a master base station and a secondary base station, where the cell group corresponding to the master base station is called a master cell group (MCG), and the cell group corresponding to the secondary base station is called a secondary cell group (SCG).

SUMMARY

However, there are limitations in the mechanisms currently available in LTE and/or NR.

The use of multiple carriers in LTE and NR is associated with various restrictions. For example, in some implementations there is a relation between carrier and cell, with only three types of cells being possibly defined for a UE:

(1) A cell in which there is one downlink carrier and one uplink carrier, and the downlink and uplink carriers are coupled/linked, e.g. the downlink and uplink carriers are in the same spectrum in a time division duplex (TDD) implementation, or the downlink and uplink spectrum are paired and defined in a band for frequency division duplex (FDD) implementation.

(2) A "physical uplink shared channel (PUSCH)-less" cell in which there is one downlink carrier.

(3) A cell with supplemental uplink (SUL) in which there is one downlink carrier, one uplink carrier, and one supplemental uplink carrier.

Also, LTE or NR systems may possibly be limited in flexibility by the many cell-related concepts used in some implementations, such as primary cell (PCell), secondary cell (SCell), serving cell, cell group (CG), master cell group (MCG), secondary cell group (SCG), primary SCG cell (PSCell), special cell (SpCell), PUCCH SCell, PUSCH-Less SCell, etc.

Implementation in LTE or NR systems is also limited to dual connectivity (DC), e.g. connectivity to more than two base stations is not supported. Also, in LTE and NR systems, CA/DC configuration and scheduling are not as flexible as may be desired. For example, in implementations in LTE and NR, the downlink and uplink carrier need to be added or removed together, e.g. by cell addition/removing (where a cell includes a downlink and uplink carrier). In addition, the downlink and uplink linkage is not flexibly configured, e.g. a FDD downlink carrier must be linked to the uplink carrier in the paired spectrum. Furthermore, radio resource management (RRM) measurement is independently performed for each carrier, leading to much measurement overhead.

More generally, the restrictions associated with the use of multiple carriers in LTE and NR may impede implementing a flexible personalized spectrum for different UEs.

Apparatuses, system, and methods are instead provided in which there is more flexible spectrum utilization, e.g. in which there may be fewer restrictions and more options for configuring carriers and/or bandwidth parts (BWPs) on a UE-specific basis. As one example, in some embodiments, there is not necessarily coupling between carriers, e.g. between uplink and downlink carriers. For example, an uplink carrier and a downlink carrier may be independently indicated so as to allow the uplink carrier and downlink carrier to be independently added, released, modified, activated, deactivated, and/or scheduled. As another example, there may be a plurality of uplink and/or downlink carriers, with signaling indicating addition, modification, release, activation, deactivation, and/or scheduling of a particular carrier of the uplink carriers and/or downlink carriers, e.g. on an independent carrier-by-carrier basis.

In some implementations, the base station may schedule a transmission on a carrier and/or BWP, e.g. using downlink control information (DCI), and the DCI may also indicate the carrier and/or BWP on which the transmission is scheduled.

In some implementations, a carrier may be configured for a particular function, e.g. one carrier may be configured for transmitting or receiving signals used for channel measurement, another carrier may be configured for transmitting or receiving data, and another carrier may be configured for transmitting or receiving control information.

In some implementations, a UE may be assigned a group of carriers, e.g. via radio resource control (RRC) signaling, but one or more of the carriers in the group might not be defined, e.g. the carrier might not be specified as being downlink or uplink, etc. The carrier may then be defined for the UE later, e.g. at the same time as scheduling a transmission on the carrier.

In some implementations, more than two carrier groups may be defined for a UE to allow for the UE to perform multiple connectivity, i.e. more than just dual connectivity.

In some implementations, there may be more flexible spectrum utilization options for initial access, e.g. multiple candidate uplink carriers and/or BWPs may be signaled by a base station and one of the uplink carriers and/or BWPs selected by the UE for use in the initial access based on the UE's requirements or scenario.

In some implementations, the number of added and/or activated carriers for a UE, e.g. the number of carriers configured for UE 110 in a carrier group, may be larger than the capability of the UE. Then, during operation, the base station may instruct radio frequency (RF) switching to communicate on a number of carriers that is within UE capabilities.

The following technical benefit may be possible in some embodiments: a more flexible personalized spectrum for different UEs communicating with a network.

The embodiments are not limited to uplink/downlink communication, but may be implemented in any situation in which two devices are wirelessly communicating with each other, e.g. over an uplink, downlink, sidelink, or backhaul link. For example, embodiments may be applied to applications such as satellite communication and Internet of Vehicle (IoV). As another example, embodiments may be applied to sidelink transmission and/or to transmission in unlicensed spectrum. As another example, embodiments may be applied to terrestrial transmission and non-terrestrial transmission (e.g. in non-terrestrial networks), and in integrated terrestrial and non-terrestrial transmission scenarios.

In one embodiment, there is provided a method performed by an apparatus, e.g. a UE. The method may include receiving first signaling indicating a plurality of uplink carriers and/or downlink carriers. The method may further include receiving second signaling indicating at least one of: addition, modification, release, activation, deactivation, or scheduling of a particular carrier of the uplink carriers and/or downlink carriers.

Decoupling of an uplink and downlink carrier may therefore be possible, e.g. by adding, modifying, releasing, activating, deactivating, or scheduling an uplink carrier and not necessarily a downlink carrier, or by adding, modifying, releasing, activating, deactivating, or scheduling a downlink carrier and not necessarily an uplink carrier.

An apparatus to perform the methods is also disclosed. The apparatus may be a UE or a network device.

In another embodiment, there is provided a method performed by a device, e.g. a network device, such as a base station. The method may include transmitting first signaling indicating a plurality of uplink carriers and/or downlink carriers. The method may further include transmitting second signaling indicating at least one of: addition, modification, release, activation, deactivation, or scheduling of a particular carrier of the uplink carriers and/or downlink carriers. The method may further include communicating with an apparatus (e.g. a UE) on at least one of the plurality of uplink carriers and/or downlink carriers. A device to perform the methods is also disclosed. The device may be a network device (e.g. base station) or a UE.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Example Communication Systems and Devices

Figure 1:
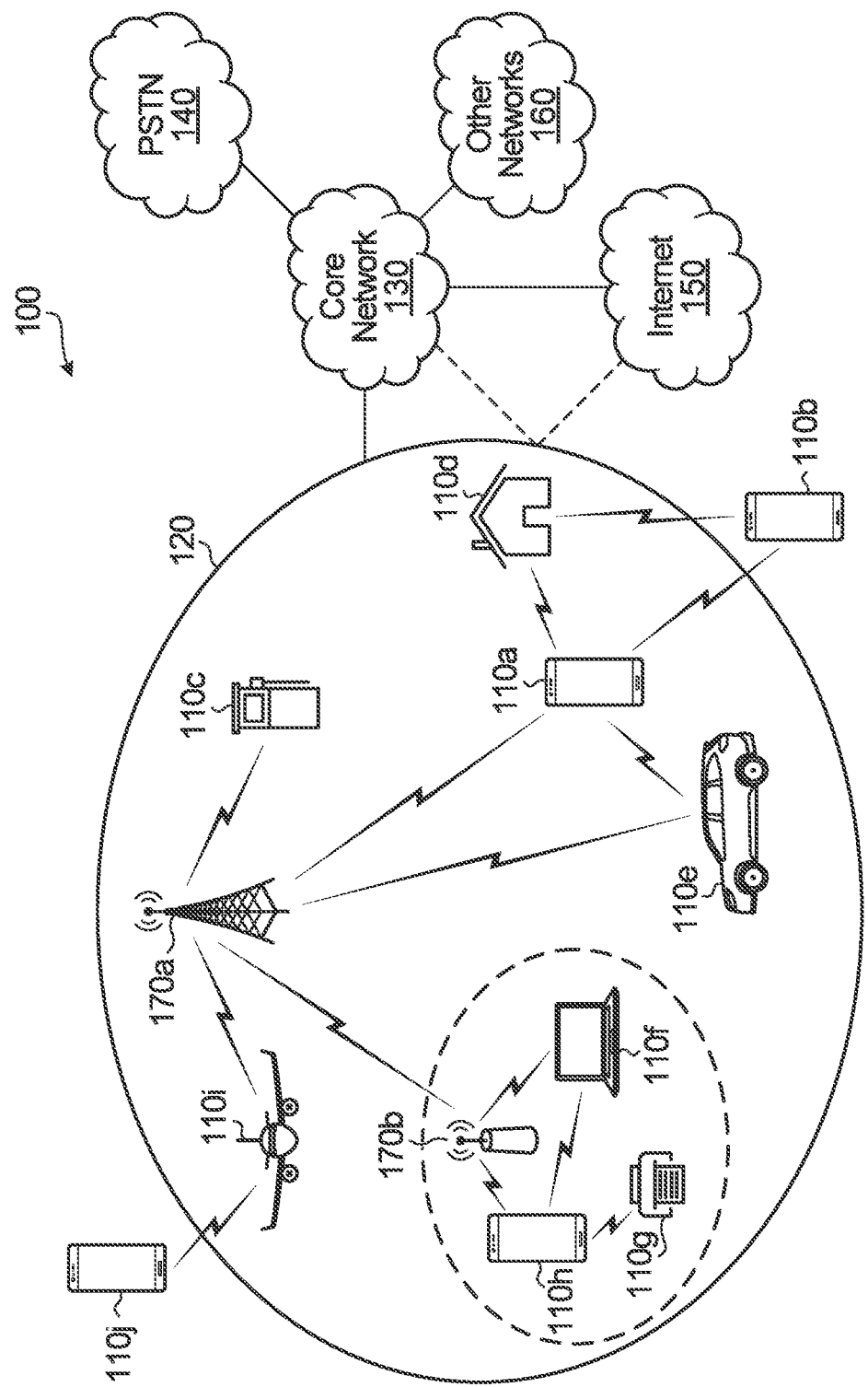
FIG. 1 is a simplified schematic illustration of a communication system, according to one example.

Referring to FIG. 1, as an illustrative example without limitation, a simplified schematic illustration of a communication system 100 is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another or connected to one or more network nodes (170a, 170b, generically referred to as 170) in the radio access network 120. A core network 130 may be a part of the communication system and may be dependent or independent of the radio access technology used in the communication system 100. Also, the communication system 100 comprises a public switched telephone network (PSTN) 140, the internet 150, and other networks 160.

Figure 2:
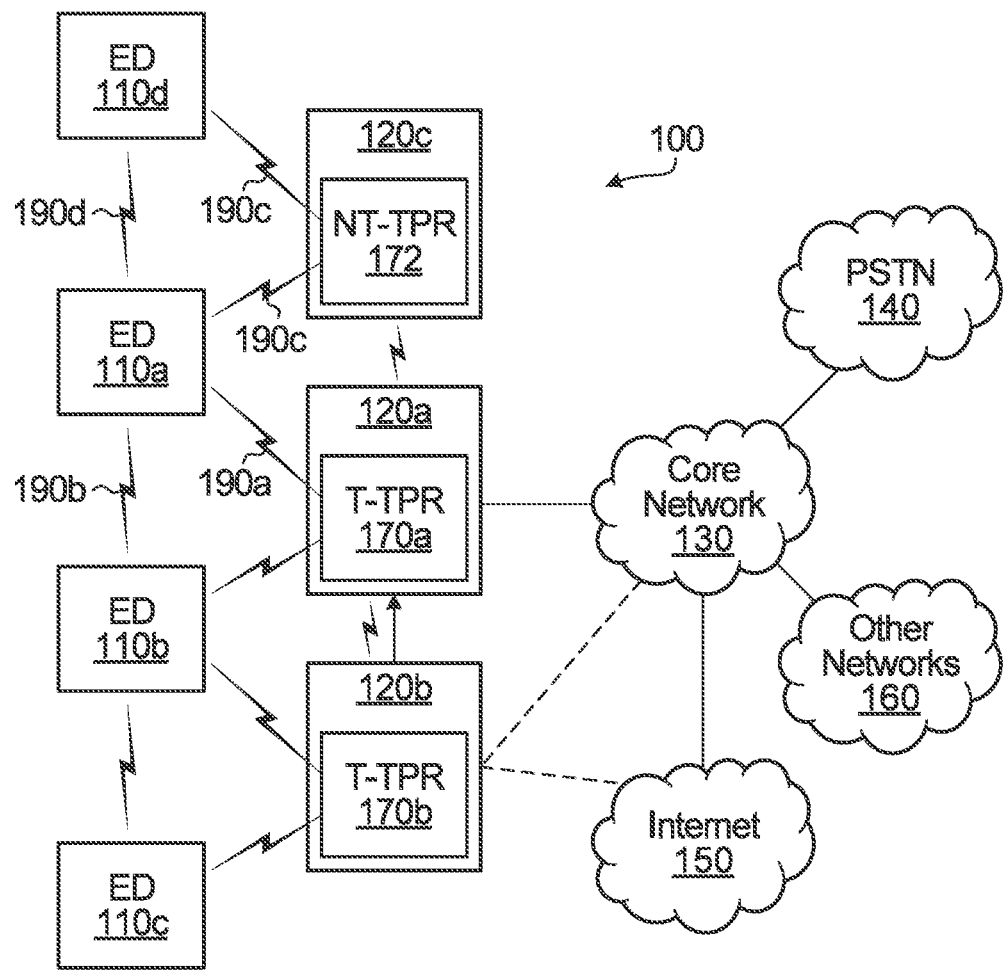
FIG. 2 illustrates another example of a communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190a and 190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110a 110b, and 110c may include functionality for communicating with different wireless networks over different wireless links using different wireless technologies and/or protocols. Instead of wireless communication (or in addition thereto), the EDs 110a 110b, and 110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110a 110b, and 110c may be multimode devices capable of operation according to multiple radio access technologies, and incorporate multiple transceivers necessary to support such.

Figure 3:
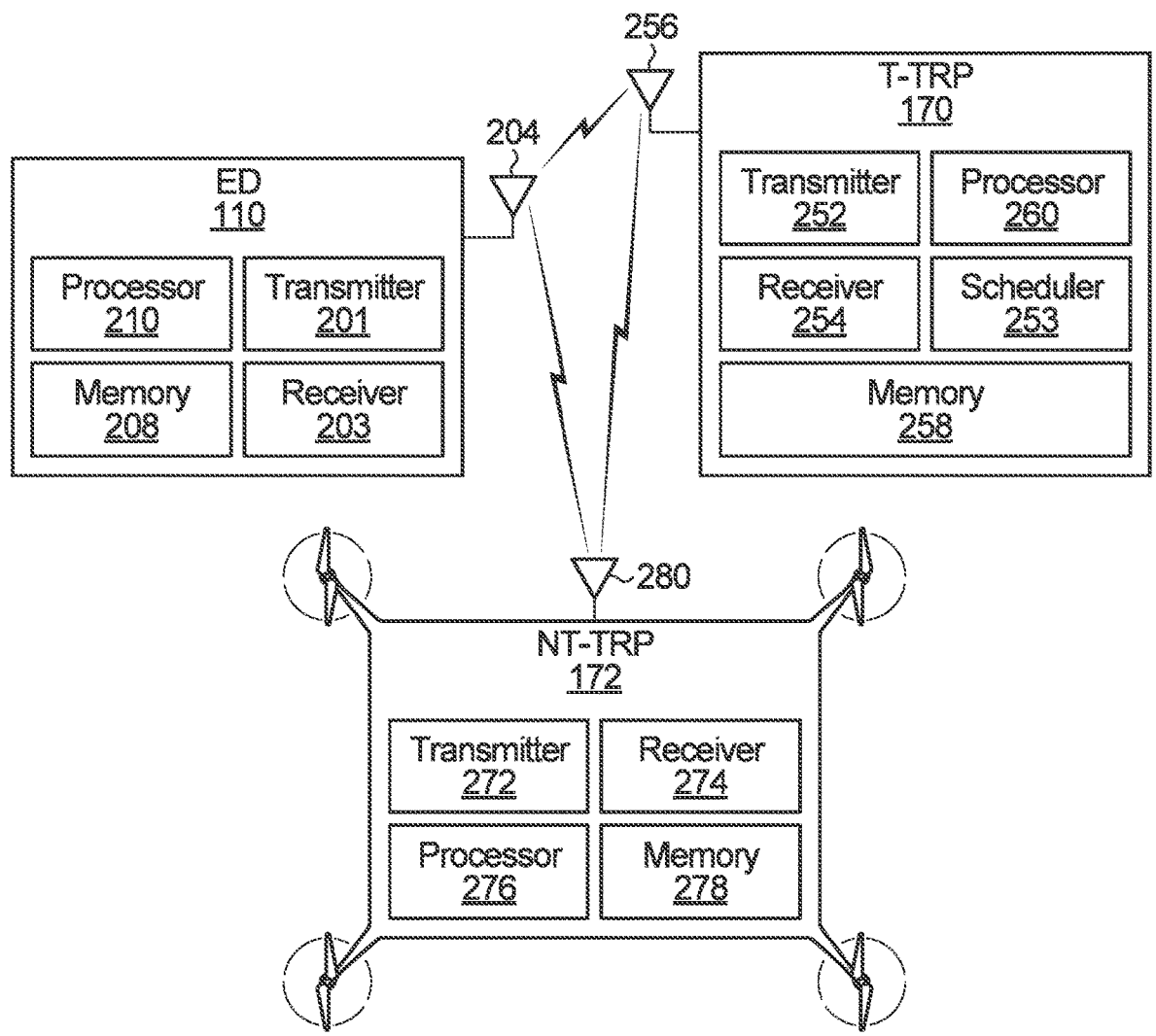
FIG. 3 illustrates an example of an electronic device (ED), a terrestrial transmit and receive point (T-TRP), and a non-terrestrial transmit and receive point (NT-TRP)

FIG. 3 illustrates another example of an ED 110, a base station 170 (e.g. 170a, 170b and/or 170c), which will be referred to as a T-TRP 170, and a NT-TRP 170. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transmitter (or transceiver) is configured to modulate data or other content for transmission by the at least one antenna 204 or network interface controller (NIC). The receiver (or transceiver) is configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations which may be described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170. The scheduler 253 may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone, it is only as an example. The NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 4:
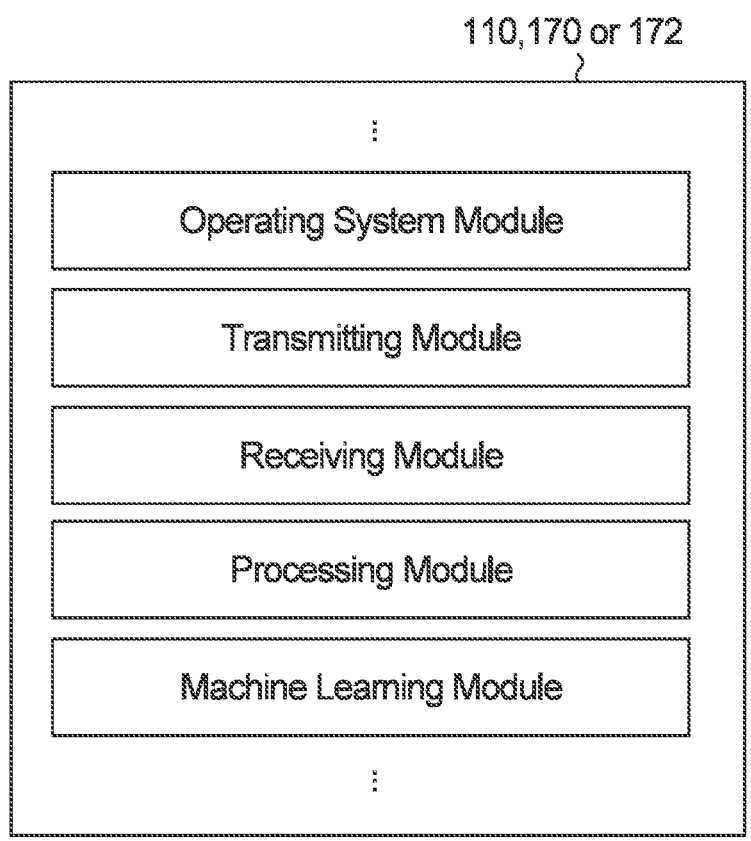
FIG. 4 illustrates example units or modules in a device.

One or more steps of the embodiment methods provided herein may be performed by corresponding units or modules, e.g. according to FIG. 4. FIG. 4 illustrates units or modules in a device, such as in ED 110, in T-TRP 170, or in NT-TRP 172. For example, operations may be controlled by an operating system module. As another example, a signal may be transmitted by a transmitting unit or a transmitting module. A signal may be received by a receiving unit or a receiving module. A signal may be processed by a processing unit or a processing module. Some operations/steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Figure 5:
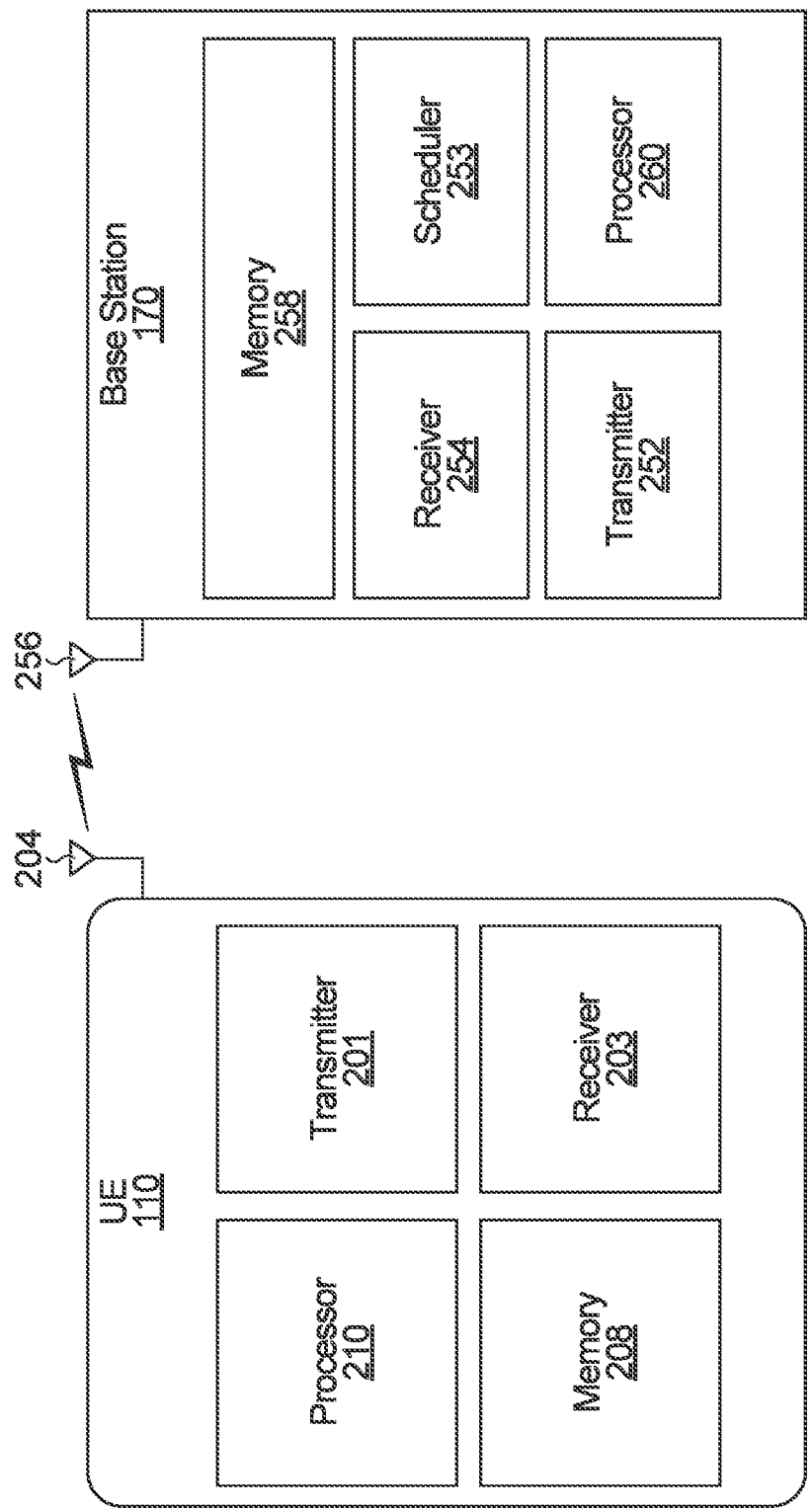
FIG. 5 is a block diagram of an example user equipment and base station.

FIG. 5 illustrates another example in which the ED 110 is specifically a UE 110 and the device on the network side is specifically a base station 170. The UE 110 and base station 170 will be used in example embodiments below.

In some embodiments, the parts of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource allocation (scheduling), message generation, encoding/decoding, etc., and that are not necessarily part of the equipment housing the antennas and/or panels of the base station 170. For example, the modules that are not necessarily part of the equipment housing the antennas/panels of the base station 170 may include one or more modules that perform the carrier and/or BWP configurations discussed herein, that generate the higher layer and/or physical layer control signaling discussed herein, etc. The modules may also be coupled to other base stations. In some embodiments, the base station 170 may actually be a plurality of base stations that are operating together to serve the UE 110, e.g. through coordinated multipoint transmissions.

The processor 260 of the base station 170 may directly perform (or control the base station 170 to perform) much of the operations described herein as being performed by the base station 170, e.g. generating an indication of an uplink carrier and/or BWP for use by the UE 110, generating an indication of a downlink carrier and/or BWP for use by the UE 110, generating indications to add/remove/activate/deactivate/modify/schedule different carriers and/or BWPs, e.g. on an carrier and/or BWP independent basis, generating information that schedules a transmission and indicates carriers and/or BWPs relating to the transmission, e.g. for flexible linkage, generating an indication of a plurality of uplink carriers and/or BWPs for initial access, generating indications configuring parameters relating to carrier groups, generating indications configuring dedicated carrier and/or BWP functions, generating indications relating to RF switching, etc.

The processor 210 of the UE 110 may directly perform (or control the UE 110 to perform) operations including those related to preparing a transmission for uplink transmission to the base station 170, and those related to processing downlink transmissions received from the base station 170. Processing operations related to preparing a transmission for uplink transmission may include operations such as encoding, modulating, precoding (e.g. MIMO precoding), beamforming, etc. Processing operations related to processing downlink transmissions may include operations such as beamforming, demodulating, and decoding, e.g. decoding the received indications. The decoding implemented depends upon the manner in which the information was encoded, e.g. information encoded using a polar code is decoded using a polar decoding algorithm, etc. The processor 210 may directly perform (or control the UE 110 to perform) many of the operations described herein as being performed by UE 110, e.g. receiving the indications configuring carriers and/or BWPs and implementing the configurations according to the indications.

Figure 6:
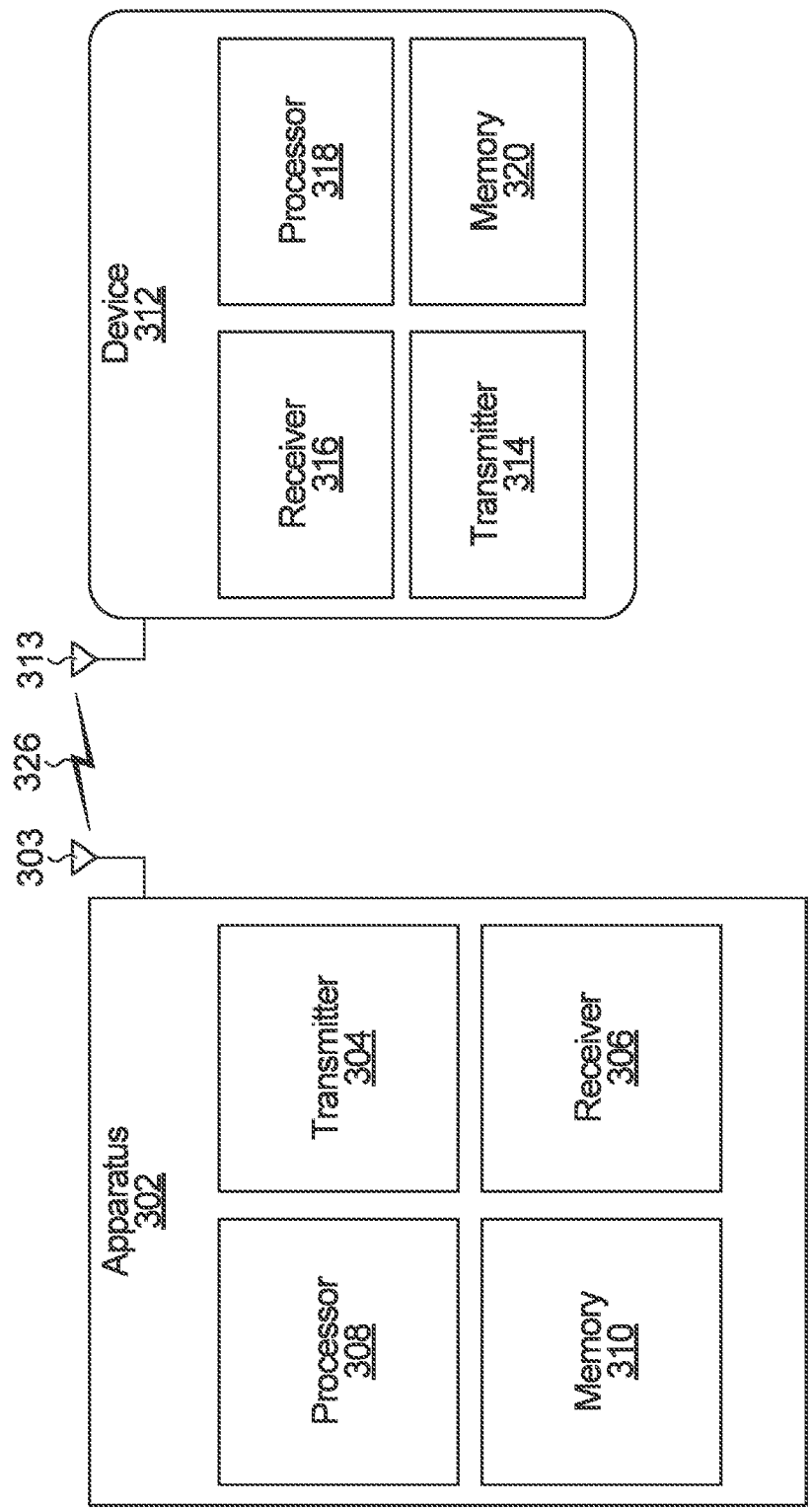
FIG. 6 is a block diagram of an example apparatus and device.

Embodiments are not limited to uplink and/or downlink communication. More generally, two devices may be wirelessly communicating with each other, and one of the devices (e.g. a network device, such as a base station) may configure spectrum (e.g. carriers and/or BWPs) for one or more other devices. FIG. 6 illustrates two devices wirelessly communicating over a wireless communications link 326, according to one embodiment. To more easily distinguish between the two devices, one will be referred to as apparatus 302 and the other will be referred to as device 312. The apparatus 302 may be a UE, e.g. UE 110. The device 312 may be a network device, e.g. a base station or a nonterrestrial network node, such as a drone or satellite. However, this is not necessary. For example, the apparatus 302 may be a UE or network device, and the device 312 may be a UE or a network device. The terms "apparatus" 302 and "device" 312 are simply used to more easily distinguish between the two entities. They may be the same type of entity, e.g. the apparatus 302 and the device 312 may both be UEs, or the apparatus 302 and the device 312 may both be network devices (e.g. base stations), although more generally this is not necessary.

In remaining embodiments, the device 312 is assumed to be the one performing the configurations described herein, e.g. flexibly adding/removing/modifying/configuring carriers and/or BWPs, and the apparatus 302 is assumed to be the one receiving the configurations. For example, the device 312 may be a base station and the apparatus 302 may be a UE.

The device 312 includes a transmitter 314 and receiver 316, which may be integrated as a transceiver. The transmitter 314 and receiver 316 are coupled to one or more antennas 313. Only one antenna 313 is illustrated. One, some, or all of the antennas may alternatively be panels. The device 312 further includes a processor 318 for directly performing (or controlling the device 312 to perform) the functions described herein related to flexible configuration of carriers and/or BWPs, e.g. operations such as: generating an indication of an uplink carrier and/or BWP for use by an apparatus (e.g. a UE), generating an indication of a downlink carrier and/or BWP for use by an apparatus, generating indications to add/remove/activate/deactivate/modify/schedule different carriers and/or BWPs, e.g. on an carrier and/or BWP independent basis, generating information that schedules a transmission and indicates carriers and/or BWPs relating to the transmission, e.g. for flexible linkage, generating an indication of a plurality of carriers and/or BWPs for initial access, generating indications configuring parameters relating to carrier groups, generating indications configuring dedicated carrier and/or BWP functions, generating indications relating to RF switching, etc. Although not illustrated, the processor 318 may form part of the transmitter 314 and/or receiver 316. The device 312 further includes a memory 320 for storing information and data.

The processor 318 and processing components of the transmitter 314 and receiver 316 may be implemented by the same or different one or more processors that are configured to execute instructions stored in a memory (e.g. in memory 320). Alternatively, some or all of the processor 318 and/or processing components of the transmitter 314 and/or receiver 316 may be implemented using dedicated circuitry, such as a programmed FPGA, a GPU, or an ASIC.

If the device 312 is base station 170, then the processor 318 may be or include processor 260, the transmitter 314 may be or include transmitter 252, the receiver 316 may be or include receiver 254, and the memory 320 may be or include memory 258.

The apparatus 302 includes a transmitter 304 and a receiver 306, which may be integrated as a transceiver. The transmitter 304 and receiver 306 are coupled to one or more antennas 303. Only one antenna 303 is illustrated. One, some, or all of the antennas may alternatively be panels.

The apparatus 302 further includes a processor 308 for directly performing (or controlling the apparatus 302 to directly perform) the operations described herein, e.g. receiving the indications configuring carriers and/or BWPs and performing the configurations according to the indications. Although not illustrated, the processor 308 may form part of the transmitter 304 and/or receiver 306. The apparatus 302 further includes a memory 310 for storing information and data.

The processor 308 and processing components of the transmitter 304 and/or receiver 306 may be implemented by the same or different one or more processors that are configured to execute instructions stored in a memory (e.g. in memory 310). Alternatively, some or all of the processor 308 and/or processing components of the transmitter 304 and/or receiver 306 may be implemented using dedicated circuitry, such as a programmed FPGA, a GPU, or an ASIC.

If the apparatus 302 is UE 110, then the processor 308 may be or include processor 210, the transmitter 304 may be or include transmitter 201, the receiver 306 may be or include receiver 203, and the memory 310 may be or include memory 208.

The apparatus 302 and the device 312 may include other components, but these have been omitted for the sake of clarity.

Cell/Carrier/BWPs/Occupied Bandwidth

A device, such as a base station, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g. the center or lowest or highest frequency of the carrier. A carrier may be on licensed or unlicensed spectrum. Wireless communication with the device may also or instead occur over one or more bandwidth parts (BWPs). For example, a carrier may have one or more BWPs. More generally, wireless communication with the device may occur over a wireless spectrum. The spectrum may comprise one or more carriers and/or one or more BWPs. The spectrum may be referred to as frequency resources. Different carriers and/or BWPs may be on distinct frequency resources.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, e.g. sidelink transmitting and receiving resources.

A BWP may be broadly defined as a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

Figure 7:
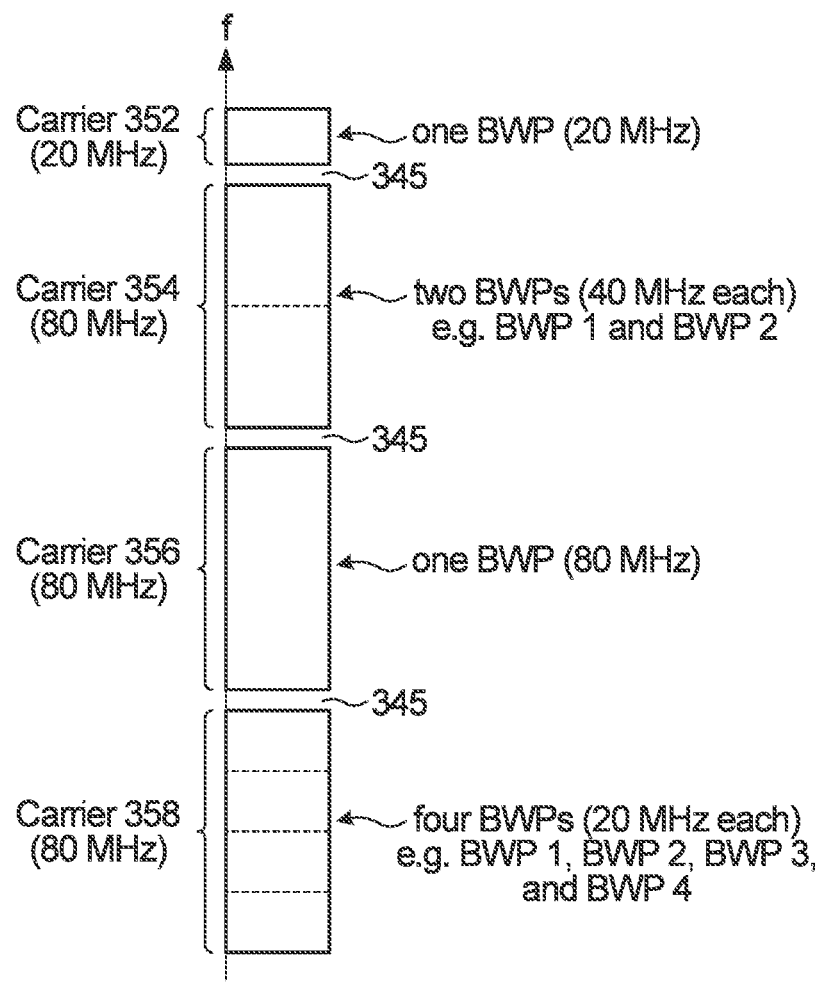
FIGS. 7 to 10 illustrate various examples of carriers and BWPs, according to different possible configurations.

Therefore, in some embodiments, a carrier may have one or more BWPs. As an example, FIG. 7 illustrates four carriers on a frequency spectrum of a wireless medium. The four carriers are respectively labelled carriers 352, 354, 356, and 358. The four carriers are contiguous with each other, except that a guard band 345 may be interposed between adjacent pairs of contiguous carriers. Carrier 352 has a bandwidth of 20 MHz and consists of one BWP. Carrier 354 has a bandwidth of 80 MHz and consists of two adjacent contiguous BWPs, each BWP being 40 MHz, and respectively identified as BWP 1 and BWP 2. Carrier 356 has a bandwidth of 80 MHz and consists of one BWP. Carrier 358 has a bandwidth of 80 MHz and consists of four adjacent contiguous BWPs, each BWP being 20 MHz, and respectively identified as BWP 1, BWP 2, BWP 3, and BWP 4. Although not shown, a guard band may be interposed between adjacent BWPs.

Figure 8:
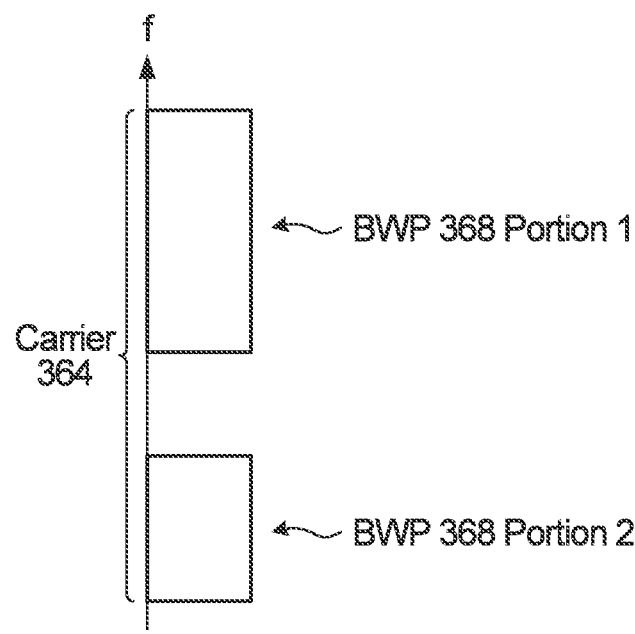

In some embodiments, a BWP has non-contiguous spectrum resources on one carrier. For example, FIG. 8 illustrates a single carrier 364 having a single BWP 368 consisting of two non-contiguous spectrum resources: BWP portion 1 and BWP portion 2.

Figure 9:
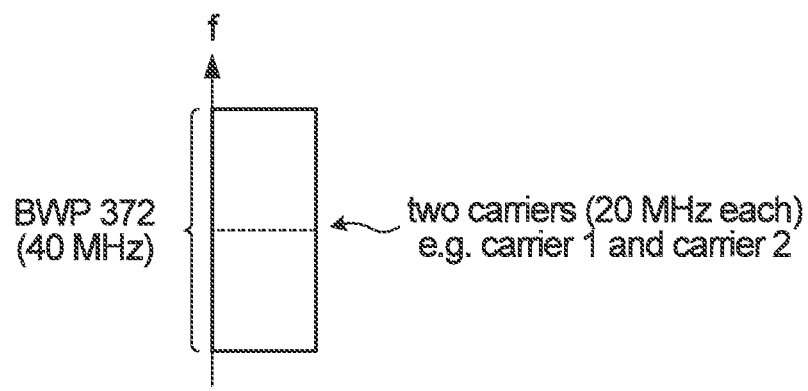

In other embodiments, rather than a carrier having one or more BWPs, a BWP may have one or more carriers. For example, FIG. 9 illustrates a BWP 372 on a frequency spectrum of a wireless medium. BWP 372 has a bandwidth of 40 MHz and consists of two adjacent carriers, labelled carrier 1 and carrier 2, with each carrier having a bandwidth of 20 MHz. Carriers 1 and 2 are contiguous, except that a guard band (not shown) may be interposed between the carriers.

Figure 10:
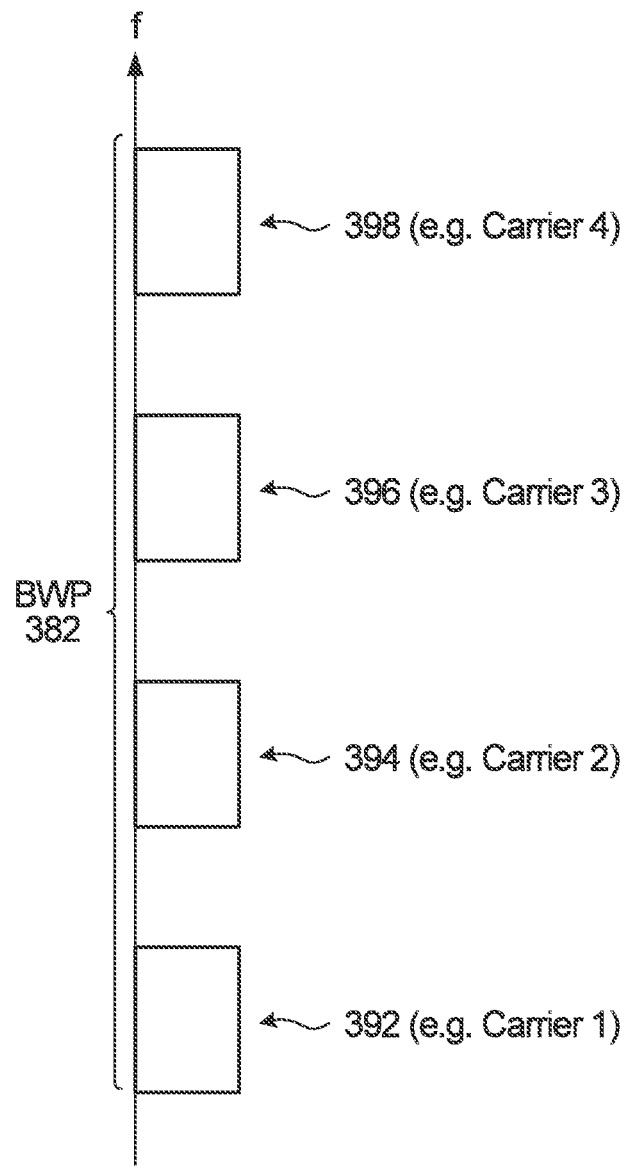

In some embodiments, a BWP may comprise non-contiguous spectrum resources which consists of non-contiguous multiple carriers. For example, FIG. 10 illustrates a single BWP 382 having four non-contiguous spectrum resources 392, 394, 396, and 398. Each non-contiguous spectrum resource consists of a single carrier. The first spectrum resource 392 is in a low band (e.g. the 2 GHz band) and consists of a first carrier (carrier 1). The second spectrum resource 394 is in a mmW band and consists of a second carrier (carrier 2). The third spectrum resource 396 (if it exists) is in the THz band and consists of a third carrier (carrier 3). The fourth spectrum resource 398 (if it exists) is in visible light band and consists of a fourth carrier (carrier 4). Resources in one carrier which belong to the BWP may be contiguous or non-contiguous. For example, the frequency resources of carrier 1 might be contiguous or non-contiguous.

Therefore, in view of the examples described in relation to FIGS. 7 to 10, it will be appreciated that a carrier may be a contiguous spectrum block for transmission and/or reception by device, such as a base station or a UE (e.g. like in FIG. 7), or a non-contiguous spectrum block for transmission and/or reception by a device (e.g. like in FIG. 8). A BWP may be a contiguous spectrum block for transmission and/or reception (e.g. like in FIGS. 7 and 9), or a contiguous spectrum block within a carrier (e.g. like in FIG. 7), or a non-contiguous spectrum block (e.g. like in FIGS. 8 and 10). A carrier may have one or more BWPs, or a BWP may have one or more carriers. A carrier or BWP may alternatively be referred to as spectrum.

In embodiments below, when "carrier/BWP" is used, it means that the embodiment applies to a carrier or a BWP or both. For example, the sentence "the UE 110 sends a transmission on an uplink carrier/BWP" means that the UE 110 may send the transmission on an uplink carrier (that might or might not have one or more BWPs), or the UE may send the transmission on an uplink BWP (that might or might not have one or more carriers). The transmission might only be on a carrier, or might only be on a BWP, or might be on both a carrier and a BWP (e.g. on a BWP within a carrier).

Wireless communication may occur over an occupied bandwidth. The occupied bandwidth may be defined as the width of a frequency band such that, below the lower and above the upper frequency limits, the mean powers emitted are each equal to a specified percentage $\beta/2$ of the total mean transmitted power, for example, the value of $\beta/2$ is taken as 0.5%.

In some embodiments, the carrier, the BWP, and/or the occupied bandwidth may be signaled by a network device (e.g. base station) dynamically, e.g. in physical layer control signaling such as DCI, or semi-statically, e.g. in radio resource control (RRC) signaling or in the medium access control (MAC) layer, or be predefined based on the application scenario; or be determined by the UE as a function of other parameters that are known by the UE, or may be fixed, e.g. by a standard.

Example embodiments will be described in the context of communications between a UE and a network, e.g. where apparatus 302 of FIG. 6 is UE 110 and device 312 of FIG. 6 is base station 170, such that the wireless communication being discussed is that between UEs and a network. However, as described earlier, the embodiments are not limited to UE and base station communication, but may apply to any situation in which an apparatus 302 communicates with a device 312 over one or more carriers/BWPs, where the apparatus 302 may have the carriers/BWPs flexibly configured, e.g. according to the various embodiments described herein.

Control information is discussed herein in some embodiments. Control information may sometimes instead be referred to as control signaling, or signaling, or configuration information, or a configuration. An example of control information is information configuring the different carriers/BWPs, e.g. information indicating that a particular carrier is added/removed, and/or information indicating that a particular carrier is for downlink, uplink, sidelink, for measurement, for use by a particular UE, etc. In some cases, control information may be dynamically indicated to the UE, e.g. in the physical layer in a control channel. An example of control information that is dynamically indicated is information sent in physical layer control signaling, e.g. downlink control information (DCI). Control information may sometimes instead be semi-statically indicated, e.g. in RRC signaling or in a MAC control element (CE). A dynamic indication may be an indication in lower layer, e.g. physical layer/layer 1 signaling (e.g. in DCI), rather than in a higher-layer (e.g. rather than in RRC signaling or in a MAC CE). A semi-static indication may be an indication in semi-static signaling. Semi-static signaling, as used herein, may refer to signaling that is not dynamic, e.g. higher-layer signaling, RRC signaling, and/or a MAC CE. Dynamic signaling, as used herein, may refer to signaling that is dynamic, e.g. physical layer control signaling sent in the physical layer, such as DCI.

In embodiments herein, "adding" a carrier/BWP for a UE refers to indicating, to the UE, a carrier/BWP that may possibly be used for communication to and/or from the UE. Adding a carrier/BWP may alternatively be referred to as "assigning" the carrier/BWP or "configuring" the carrier/BWP. In some embodiments, adding the carrier/BWP for a UE may include indicating, to the UE, one or more parameters of the carrier/BWP, e.g. indicating the carrier/BWP frequency and/or the carrier/BWP bandwidth and/or the carrier/BWP index. In some embodiments, the carrier/BWP may be added to a carrier/BWP group that is associated with the UE.

Activating a carrier/BWP refers to indicating, to the UE, that the carrier/BWP is now available for use for communication to and/or from the UE. In some embodiments, a carrier/BWP is implicitly or explicitly activated at the same time the carrier/BWP is added for the UE. In other embodiments, a carrier/BWP may be added and later activated using control signaling (e.g. using dynamic control signaling, such as DCI). Therefore, it is possible in some embodiments that a carrier/BWP be added for the UE but initially deactivated, i.e. not available for wireless communication for the UE, such that no transmissions are scheduled or sent or received by the UE on the carrier/BWP. The carrier/BWP may be subsequently activated, and then possibly deactivated again later.

"Scheduling" a carrier/BWP for a UE refers to scheduling a transmission on the carrier/BWP. In some embodiments, the scheduling of a carrier/BWP may explicitly or implicitly add and/or activate the carrier/BWP for the UE if the carrier/BWP is not previously added and activated.

"Removing" a carrier/BWP for a UE refers to indicating, to the UE, that the carrier/BWP is no longer available to possibly be used for communication to and/or from the UE. The carrier/BWP may be removed from a carrier/BWP group associated with the UE. Removing a carrier/BWP may alternatively be referred to as "releasing" the carrier/BWP or "de-configuring" the carrier/BWP. In some embodiments, removing a carrier/BWP is the same as deactivating the carrier/BWP. In other embodiments, a carrier/BWP might be deactivated without being removed.

"Modifying" a carrier/BWP for a UE refers to updating/changing the configuration of a carrier/BWP for a UE, e.g. changing the carrier/BWP index and/or changing the bandwidth and/or changing the transmission direction and/or changing the function of the carrier/BWP, etc. In some embodiments, modifying the carrier/BWP does not change the activation status of the carrier/BWP, e.g. if the carrier/BWP is activated then it remains activated after the modification.

In general, carriers/BWPs may be added/removed/modified/activated/deactivated/scheduled for a UE via control signaling from the base station, e.g. dynamically in physical layer control signaling (such as in DCI) or semi-statically in higher-layer signaling (such as RRC signaling) or in a MAC CE.

In some embodiments herein, a carrier/BWP is sometimes configured as an "uplink carrier/BWP" or a "downlink carrier/BWP". An uplink carrier/BWP is a carrier or BWP that is configured for uplink transmission. A downlink carrier/BWP is a carrier or BWP that is configured for downlink transmission. In some embodiments, a carrier/BWP may switch from an uplink carrier/BWP to a downlink carrier/BWP, and/or vice versa, e.g. in response to control signaling received from the base station. The control signaling may be dynamic (e.g. physical layer control signaling, such as in DCI) or semi-static (e.g. in higher-layer signaling, such as RRC signaling, or in a MAC CE). In some embodiments, the transmission direction of a carrier/BWP may be configured when a transmission is scheduled on the carrier/BWP, e.g. in the same DCI that schedules the transmission on the carrier.

Flexible Carrier/BWP for Initial Access

In some embodiments, when UE 110 is to initially connect with the network (e.g. upon powering on), the UE 110 performs an initial access procedure. The initial access procedure is implementation specific, but may include operations relating to synchronization, decoding and reading the system information, generating a random access request for transmission, etc. For example, in one implementation: the UE 110 searches for one or more synchronization signals, e.g. a primary synchronization signal (PSS) and a secondary synchronization signal (SSS); the UE 110 decodes a physical broadcast channel (PBCH) to read a master information block (MIB) in order to obtain necessary system information; information in system information blocks (SIBs) are also read; and the UE 110 performs a random access procedure. The random access procedure is sometimes referred to as a random access channel (RACH) procedure and may include: transmission of a preamble (RACH preamble) ("msg1") by UE 110; receipt of a random access response (RAR) ("msg2") from base station 170; transmission of information, such as a RRC connection request ("msg3") by UE 110; and a response to msg3 ("msg4"), e.g. connection confirmation information, from base station 170.

In some embodiments, there may be multiple candidate uplink carriers/BWPs for use by a UE during initial access, and each UE may be able to select a particular carrier/BWP from the candidate uplink carriers/BWPs. For example, during the initial access procedure, UE 110 initially connects on a downlink carrier/BWP, e.g. to search for synchronization signals and read system information, such as to obtain a MIB and/or a SIB. In some embodiments, the connected downlink carrier/BWP may be associated with a minimum UE capability, e.g. associated with a low power or low throughput operating mode of the UE 110, such that UE 110 can initially connect in a low power/low throughput operating mode. Then, in the system information (e.g. MIB or SIB) or in other signaling (e.g. RRC signaling) sent in the downlink carrier/BWP, the base station 170 may indicate, to UE 110, the candidate uplink carriers/BWPs. The base station 170 may possibly also indicate the minimum UE capability requirements for each candidate uplink carrier/BWP, or the minimum UE capability requirements for each candidate uplink carrier/BWP may be predefined. For example, a particular candidate uplink carrier/BWP may be associated with a particular minimum number of receive or transmit chains (e.g. minimum number of receive and/or transmit antennas) to reduce or minimize UE power consumption, which may be realized by restricting a maximum number of MIMO layers or by directly indicating the number of receive/transmit chains, etc.

The UE 110 selects one of the candidate uplink carriers/BWPs for performing one or more uplink communications in the initial access procedure, e.g. for performing the RACH procedure. For example, the selected candidate uplink carrier/BWP may be used by the UE 110 for transmitting msg1 and/or msg3 in the RACH procedure of the initial access. Different UEs may select different candidate uplink carriers/BWPs. For example, UEs having different capabilities and/or different service scenario requirements or goals may select different candidate uplink carriers/BWPs.

As an example, four candidate uplink carriers may be indicated by the base station 170 on the primary downlink carrier in a MIB or SIB during initial access: (1) a 1.8 GHz FDD uplink carrier, where 1.8 GHz is the center frequency of the carrier and the bandwidth of the carrier may be predefined or also indicated, and the carrier is for FDD communication; (2) a 2.6 GHz TDD uplink carrier, where 2.6 GHz is the center frequency of the carrier and the bandwidth of the carrier may be predefined or also indicated, and the carrier is for TDD communication; (3) a 3.5 GHz TDD uplink carrier, where 3.5 GHz is the center frequency of the carrier and the bandwidth of the carrier may be predefined or also indicated, and the carrier is for TDD communication; (4) a carrier on unlicensed spectrum. Each UE may select one of the candidate uplink carriers for use for one or more uplink transmissions during initial access. For example, if UE 110 is associated with a service scenario in which high reliability but lower throughput is acceptable, then UE 110 may select the 1.8 GHz uplink carrier. If, on the other hand, higher throughput is required or desired, then UE 110 may select the 3.5 GHz uplink carrier. If, alternatively, the UE 110 is operating in a low power mode, an uplink carrier may be selected that is associated with power savings, e.g. an uplink carrier associated with a small number of transmit chains.

Because each UE may flexibly select one of multiple uplink carriers/BWPs for initial access, a UE may be able to achieve faster initial access or coverage enhancement of uplink transmission because of the availability of the different options. Flexible spectrum utilization is available, which may be used by different UEs for different base station or UE requirements, such as low latency, or larger coverage, or power saving.

In some embodiments, for each candidate uplink carrier/BWP, the base station 170 individually indicates a power control parameter for uplink power control.

In some embodiments, the UE 110 may select one of multiple different downlink carriers/BWPs for performing initial access. For example, the base station 170 may transmit multiple downlink transmissions, each on a respective different carrier/BWP and each available for use for initial access (e.g. each carrying a respective synchronization signal or SSB). In one example, the multiple downlink transmission might be on different beams and/or during different time slots. The UE 110 may select one of the downlink carriers/BWPs to perform the initial access, and the candidate uplink carriers/BWPs may be indicated via the selected downlink carrier/BWP. In some embodiments, one or more of the candidate uplink carriers/BWPs indicated on different downlink carriers/BWPs may be the same. For example, the initial access procedure may be performed using a first downlink carrier/BWP, but a second downlink carrier/BWP was also available for the initial access procedure but not selected by the UE 110. However, both the first downlink carrier/BWP and the second downlink carrier/BWP indicate one or more of the same candidate uplink carriers/BWPs. The following problem may occur: if the UE 110 selects a particular one of the candidate uplink carriers/BWPs that is indicated on both the first and second downlink carrier/BWPs, then it is not clear to the base station 170 whether the UE 110 is using the first downlink carrier/BWP or the second downlink carrier/BWP for the initial access. That is, the uplink carrier/BWP used by the UE 110 does not, itself, have a unique mapping to a particular downlink carrier/BWP. Therefore, in some embodiments, a particular resource is used by the UE 110 when sending an uplink transmission on the selected uplink carrier/BWP during the initial access, and the particular resource has an association with a particular downlink carrier/BWP, e.g. it uniquely corresponds to a particular downlink carrier/BWP, such that the base station 170 is able to determine, from the particular resource, which downlink carrier/BWP the UE 110 is using for the initial access procedure. The resource may be indicated in the downlink carrier/BWP in some embodiments. In one example, the resource is a preamble, e.g. a RACH preamble. For example, if the UE 110 performs the initial access procedure using the first downlink carrier/BWP, then the UE 110 transmits a first RACH preamble in an uplink transmission during the initial access procedure, and that first RACH preamble uniquely maps to the first downlink carrier/BWP. On the other hand, if the UE 110 performs the initial access procedure using the second downlink carrier/BWP, then the UE 110 transmits a different second RACH preamble in an uplink transmission during the initial access procedure and that second RACH preamble uniquely maps to the second downlink carrier/BWP. The first and second RACH preambles may be predefined, preconfigured, or indicated in the respective downlink carrier/BWP (e.g. the first downlink carrier/BWP may transmit an indication indicating that the UE 110 is to use the first RACH preamble, and the second downlink carrier/BWP may transmit an indication indicating that the UE 110 is to use the second RACH preamble). In another example, the resource is a time-frequency resource. For example, if the UE 110 performs the initial access procedure using the first downlink carrier/BWP, then the UE 110 transmits an uplink transmission during the initial access procedure on a first time-frequency resource, and that first time-frequency resource uniquely maps to the first downlink carrier/BWP. On the other hand, if the UE 110 performs the initial access procedure using the second downlink carrier/BWP, then the UE 110 transmits an uplink transmission during the initial access procedure on a different second time-frequency resource and that second time-frequency resource uniquely maps to the second downlink carrier/BWP. The first and second time-frequency resources may be predefined, preconfigured, or indicated in the respective downlink carrier/BWP (e.g. the first downlink carrier/BWP may transmit an indication indicating that the UE 110 is to use the first time-frequency resource, and the second downlink carrier/BWP may transmit an indication indicating that the UE 110 is to use the second time-frequency resource).

In some embodiments, the initial access procedure may be used by the base station 170 to transmit one or more timing advance (TA) values to UE 110 for uplink synchronization of UE 110. For example, a TA value may be transmitted in or along with a RAR. In some embodiments, post-initial access, the UE 110 may be able to communicate with the base station 170 on multiple uplink carriers/BWPs. One or more of the uplink carriers/BWPs may be grouped into a timing advance group (TAG), such that a single TA value for that TAG is provided to the UE 110 and used, by the UE 110, for offsetting an uplink transmission (for uplink synchronization) on any of the uplink carriers in the TAG. In some embodiments, the base station 170 may configure the number of TAGs and/or the number of carriers for each TAG for a UE 110, e.g. in a downlink communication during initial access. In some embodiments, the base station 170 may configure which carrier is to be used for transmission of the single TA value post-initial access, e.g. the carrier on which updates to the single TA are transmitted by the base station 170. In some embodiments, the configuration may be implemented by sending an indication of the configuration in the downlink dynamically (e.g. in physical layer control signaling, such as DCI), or semi-statically (e.g. in RRC signaling, or in a MAC CE), e.g. during the initial access procedure.

During operation after initial access, carriers/BWPs used by a UE may be associated with different levels of flexibility, e.g. according to the various embodiments described below.

Carrier Groups

In some embodiments, during operation each UE may be assigned one or more carrier groups. Different UEs may be assigned different carrier groups. A carrier group includes one or more carriers. In some embodiments, each carrier group has an associated MAC entity. Although not necessary, in some embodiments, each carrier group may be used for communication with a respective different base station, e.g. a first carrier group may be used for communication with a first base station (e.g. the primary base station serving the UE), a second carrier group may be used for communication with a second base station, a third carrier group may be used for communication with a third base station, etc.

With the use of carrier groups, multiple connectivity (MC) may be supported, and not necessarily limited to dual connectivity (DC). In one example, a UE may be configured to have three carrier groups and communicate with three different base stations. In another example, a UE may be configured to have three carrier groups, with each one used to communicate on a respective different network standard, e.g. a triple connection to be simultaneously connected to an LTE, NR, and 6G network. As another example, a UE may be configured to have two carrier groups for a dual connection: one for communication with a terrestrial network node, and another for communication with a non-terrestrial network node.

In some embodiments, one of the carrier groups is a primary carrier group, which is the carrier group having the primary carrier. The primary carrier is the carrier for initial access.

In some embodiments, a carrier group may have one or more "PUCCH groups". A PUCCH group is a grouping of one or more carriers in which only one carrier in the group is for sending uplink control info (such as HARQ feedback). For example, all downlink carriers or downlink transmissions on any carriers within a same PUCCH group have their HARQ feedback indicated on the single carrier in the PUCCH group that is designated for sending the uplink control info (UCI).

The following are each possibly configurable, e.g. on a UE-specific basis: the number of carrier groups; and/or the number of carriers in a carrier group; and/or the number of PUCCH groups that are in a carrier group; and/or the number of carriers that are in each PUCCH group; and/or the carrier in a PUCCH group that is designated for carrying UCI. The configuration may be indicated semi-statically (e.g. in higher-layer signaling, such as RRC signaling, or in a MAC CE) or dynamically (e.g. in DCI). The configuration may be indicated over the primary carrier. As one example, the configuration may be indicated in RRC signaling on the RRC connection established on the primary carrier.

Figure 11:
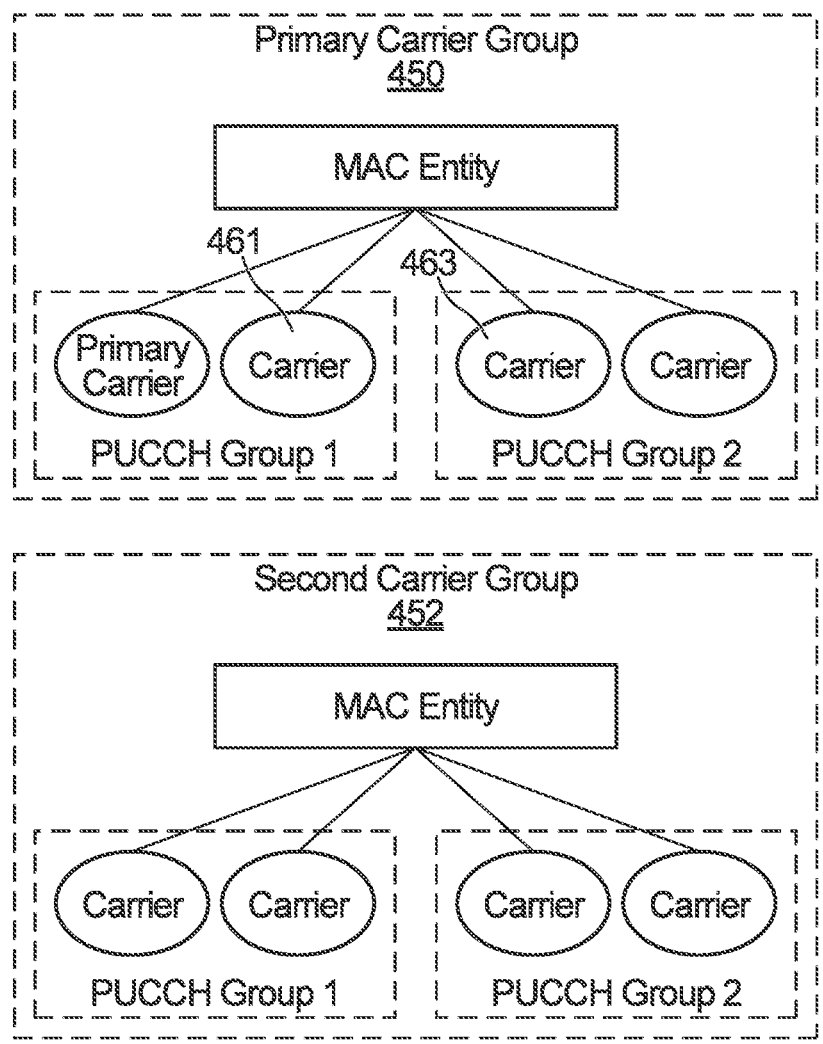
FIG. 11 illustrates two carrier groups configured for a UE, according to one embodiment.

FIG. 11 illustrates two carrier groups 450 and 452 configured for a UE 110, according to one embodiment. Each carrier group is associated with a different MAC entity. Carrier group 450 is the primary carrier group because it includes the primary carrier. The primary carrier is the carrier used for initial access. RRC connection, security, non-access stratum (NAS) mobility, and/or radio link failure (RLF) may be based on the primary carrier. Carrier group 452 is a secondary carrier group because it does not include the primary carrier. In the secondary carrier group, there may optionally be a carrier that is the primary secondary carrier, which may be indicated by the base station 170. A primary secondary carrier may serve a similar function as the primary secondary carrier in previous systems, e.g. for initial access in the secondary carrier group. Alternatively, in the secondary carrier group all carriers may be the same carrier type. In the example in FIG. 11, each carrier group 450 and 452 has two PUCCH groups, although this is only an example. Each PUCCH group has one carrier that is used to send UCI for the PUCCH group. As an example, in carrier group 450, the carrier 461 in PUCCH group 1 is used for transmitting UCI. It is the only carrier in PUCCH group 1 configured to transmit UCI. For example, if a downlink transmission occurs in the primary carrier, then HARQ feedback for the transmission is sent in the uplink in carrier 461. The carrier 463 in PUCCH group 2 is used for transmitting UCI. It is the only carrier in PUCCH group 2 configured to transmit UCI. For example, if a downlink transmission occurs on any carrier in PUCCH group 2 of carrier group 450, then the HARQ feedback from the transmission is sent in the uplink in carrier 463. The carrier configured to transmit UCI in a PUCCH group is configurable and may be indicated semi-statically (e.g. in higher-layer signaling, such as RRC signaling, or a MAC CE) or dynamically, e.g. in DCI. In the PUCCH group that includes the primary carrier, the primary carrier does not need to be the carrier configured to transmit UCI, which provides for increased flexibility.

FIG. 11 is only an example. Variations are possible. For example, if in carrier group 450 UCI was transmitted on each carrier, then each carrier would be its own PUCCH group. As another example, if in carrier group 450 UCI was transmitted on only one carrier, then the carrier group 450 would only have one PUCCH group having all four carriers. In some embodiments, there might not even be a PUCCH group, e.g. if there are no uplink transmissions.

In some embodiments, within a carrier group there may be one or more HARQ entities. A HARQ entity is an entity that controls a respective set of one or more HARQ processes. The HARQ process(es) controlled by one HARQ entity are typically different from the HARQ process(es) controlled by another HARQ entity. The number of HARQ entities associated with a carrier group may be configurable. A HARQ entity may be associated with one or more carriers, and the particular carriers associated with a particular HARQ entity may be configurable. In some embodiments, a HARQ process may be shared across carriers, e.g. to enable retransmission in a carrier different from the carrier in which a previous transmission (e.g. the initial transmission) was sent. Sharing a HARQ process across carriers is not limited to implementations involving carrier groups. Some embodiments described later (which can be implemented even when there is no concept of a carrier group) include features such as: indicating (e.g. in DCI) a carrier on which to send HARQ feedback, and/or indicating whether the transmission is a retransmission, and if the transmission is a retransmission, then the carrier having the corresponding previous transmission (e.g. the initial transmission) may be indicated. More generally, even in embodiments in which there are no carrier groups, a HARQ entity may still be associated with one or more carriers, the particular carriers associated with a particular HARQ entity may be configurable, and/or a HARQ process may be shared across carriers.

As discussed above, in some embodiments, the number of carrier groups for a UE 110 may be configured, e.g. semi-statically (such as in RRC signaling or in a MAC CE), with one MAC entity per carrier group. There may be one carrier group for simple carrier aggregation (CA), two carrier groups for dual connectivity (DC), more than two carrier groups for multiple connectivity (MC), etc. A PUCCH group within a carrier group may be configured. There may be joint UCI feedback in one carrier in a PUCCH group. This discussion of carrier groups equally applies to BWP groups. For example, instead of (or in addition to) carrier groups, there may be BWP groups, e.g. a primary BWP group having multiple BWPs including a primary BWP, and one or more secondary BWP groups, each having multiple BWPs. One or more PUCCH groups may exist, with a PUCCH group having a single BWP designated for transmitting UCI. As an example, FIG. 11 may be modified to replace "carrier" with "BWP".

The use of carrier groups (and/or BWP groups) is optional. Embodiments below may be implemented in the context of carrier/BWP groups or in implementations in which there are no carrier/BWP groups.

Flexible Carrier/BWP Adding/Removing/Modifying/Activating/Deactivating

In some embodiments, during operation post-initial access, the base station 170 may transmit carrier/BWP addition or reduction signaling that is used to add or remove carriers/BWPs for a UE 110, e.g. on an individual carrier-by-carrier (or BWP-by-BWP) basis. For example, adding or removing a carrier/BWP for UE 110 might be based on predicted UE traffic, and/or network load/power saving requirements. For example, if there are multiple UEs communicating with base station 170, and it is determined that a first UE will or may have a heavy traffic requirement, then one or more additional carriers/BWPs may be assigned to the first UE to increase bandwidth for the first UE. If it is determined that a second UE is or may be operating in a low power mode with low throughput, then carriers/BWPs may be removed or not assigned to the second UE, e.g. to allow for some power savings for the UE because the UE does not having to monitor/accommodate as many carriers/BWPs. The carrier/BWP addition or reduction procedure may be triggered by the base station 170 or by a UE. In one example, UE 110 may send a spectrum addition request to the base station 170 if the UE 110 anticipates high traffic demand. The spectrum addition request is a request for additional frequency resources for communicating with the base station 170. In response, the base station 170 may trigger a spectrum addition procedure in order to add one or more additional carriers/BWPs for the UE 110, e.g. by sending carrier/BWP addition signaling to the UE 110. In some embodiments, when making the spectrum addition request, the UE 110 may also include preferred spectrum/carrier/BWP resources.

In some embodiments, there may be a unified carrier/BWP adding/removing/modifying procedure, e.g. one that is consistent across different devices or standards. The adding/removing/modifying may be part of carrier/BWP management.

For example, in some embodiments, the base station 170 may add, modify, or remove a particular carrier for a UE, e.g. semi-statically by RRC signaling or a MAC CE. For instance, RRC signaling may be transmitted by the base station 170, and the RRC signaling may carry a "CarrierToAddModList", which is information that lists the carriers to add/modify for one or more UEs. As another example, the RRC signaling may carry a "CarrierToReleaseList", which lists the carriers to remove for one or more UEs. The signaling may be UE-specific or groupcast to a group of UEs (e.g. identified by a group ID). In some embodiments, the base station may add, modify, or remove a BWP for a UE, e.g. semi-statically by RRC signaling or a MAC CE. For instance, RRC signaling may be transmitted by the base station 170 carrying a "BWP-ToAddModList", which lists the BWPs to add/modify for one or more UEs. As another example, the RRC signaling may carry a "BWP-ToReleaseList", which lists the BWPs to remove for one or more UEs. The signaling may be UE-specific or groupcast to a group of UEs. If there are one or more BWPs in a carrier, then the BWP index may be numbered in all the carriers, e.g. to uniquely identify a particular BWP within a carrier.

In some embodiments, there may be individual carrier/BWP adding and/or removing signaling for downlink, uplink, sidelink, and/or an unlicensed spectrum. For example, the base station 170 may transmit, e.g. in RRC signaling, a "DL-CarrierToAddModList" listing downlink carriers to be added or modified for UE 110 (or for a group of UEs), and the base station 170 may transmit, e.g. in RRC signaling, a "DL-CarrierToReleaseList" listing downlink carriers to be removed for UE 110 (or for a group of UEs). As another example, the base station 170 may transmit, e.g. in RRC signaling, an "UL-CarrierToAddModList" listing the uplink carriers to be added or modified for UE 110 (or for a group of UEs), and the base station 170 may transmit, e.g. in RRC signaling, a "UL-CarrierToReleaseList" listing uplink carriers to be removed for UE 110 (or for a group of UEs). In this way, uplink and downlink carriers may be added and removed independently for UE 110 (or for a group of UEs). The same applies to sidelink and unlicensed spectrum, i.e. transmitting and receiving carriers on a sidelink and/or on unlicensed spectrum may be configured independently and separately for UE 110 (or for a group of UEs).

In some embodiments, the base station 170 may separately configure, in semi-static signaling (e.g. in RRC signaling), one or more carriers as described above (e.g. one or more uplink carriers, downlink carriers, sidelink and/or unlicensed transmitting or receiving carriers). For each carrier, the base station 170 may configure one or more of the following parameters: carrier frequency and/or carrier bandwidth and/or carrier index, where carrier frequency is a representative frequency of the carrier (e.g. the center frequency of the carrier). The carrier index is the number identifying the carrier. An index may alternatively be called an identifier (ID). In some embodiments, the "DL-CarrierToAddModList" or "UL-CarrierToAddModList" may include the carrier frequency and/or carrier bandwidth and/or carrier index for a downlink or uplink carrier being added.

One example way to configure the carrier index is as follows for a downlink, uplink, sidelink (transmitting or receiving), or unlicensed (transmitting or receiving) carrier. Select the value of the carrier index as N, where N is an integer between 0 and a maximum number referred to as MaxN. That is $0 \leq N \leq MaxN$. The value of MaxN may be predefined or preconfigured. For two carriers, the carrier index can, in general, be the same or different. In some embodiments, if the carrier index is the same for two carriers, then the carrier frequency and carrier bandwidth is the same for the two carriers. For TDD spectrum, the downlink carrier and uplink carrier occupy the same carrier frequency/carrier bandwidth. In such a TDD implementation, after configuring the downlink carrier, the uplink carrier configuration might only indicate the carrier index, with the carrier frequency/carrier bandwidth of the uplink carrier following the configuration of the downlink carrier with the same carrier index. The vice versa is also a possibility, i.e. after configuring the uplink carrier, the downlink carrier configuration might only indicate the carrier index, with the carrier frequency/carrier bandwidth of the downlink carrier following the configuration of the uplink carrier with the same carrier index.

Another example way to configure the carrier index is to have a separate carrier index for a downlink, uplink, sidelink, and/or unlicensed carrier. For example, for a downlink carrier being added for UE 110, the carrier index DL_N is an integer $a \leq DL\_N \leq b$, where a and b are integers predefined or preconfigured. For an uplink carrier being added for UE 110, the carrier index UL_N is an integer $c \leq UL\_N \leq d$, where c and d are integers predefined or preconfigured. The range of a to b may be non-overlapping with the range of c to d.

In some embodiments, adding a carrier might not include activating the carrier, e.g. the carrier is added but is initially deactivated by default. In such embodiments, once a carrier has been added for a UE 110, the carrier may be subsequently activated (and then possibly later deactivated again). The activation/deactivation may be by RRC signaling or a MAC CE or DCI. In some embodiments, the base station 170 may activate/deactivate a downlink and uplink carrier separately. For example, for a linked downlink and uplink carrier with same spectrum (TDD), the base station 170 may de-activate the downlink carrier and keep the uplink carrier active, which may save power consumption relating to monitoring the downlink carrier, while maintaining uplink throughput.

The explanation above also applies to BWPs, where a BWP may be within a carrier or not, depending upon the implementation. There may be separate adding/removing/activating/deactivating signaling for a downlink BWP, an uplink BWP, a transmitting BWP (on sidelink and/or unlicensed spectrum), and/or a receiving BWP (on sidelink and/or unlicensed spectrum). In some embodiments, the base station 170 configures, e.g. in RRC signaling, one or more dedicated downlink BWPs and/or one or more dedicated uplink BWPs separately for UE 110. For configured BWPs, the spectrum resources may be within the same frequency band or different frequency bands. To configure a BWP, the base station 170 may indicate the BWP frequency, the BWP bandwidth, and/or the BWP index.

In some embodiments, the BWP indices are jointly numbered among carriers. For example, assume there are two carriers respectively indexed/labelled carrier 1 and carrier 2, and each carrier has two BWPs, which may be downlink and/or uplink BWPs, depending upon the implementation. For the BWPs in carrier 1, the BWP indices are 1 and 2, and for the BWPs in carrier 2, the BWP indices are 3 and 4. In some embodiments, for BWP addition or modification or release, the base station 170 uses RRC signaling to add or modify or release a BWP, where the RRC signaling indicates the BWP index. Given the indicated BWP index, the UE 110 knows the carrier index. That is, the BWP index uniquely maps to a particular carrier. For example, continuing the example just mentioned, if the BWP to be added and/or activated for a UE 110 is the BWP corresponding to BWP index 4, then the base station 170 indicates BWP index 4 to the UE 110. The UE 110 knows that BWP index 4 is in carrier 2, and so the index of carrier 2 does not need to be signaled, thereby saving signaling overhead. As another example, if the BWP to be deactivated and/or removed for a UE 110 is the BWP corresponding to BWP index 1, then the base station 170 indicates BWP index 1 to the UE 110. The UE 110 knows that BWP index 1 is in carrier 1, and so the index of carrier 1 does not need to be signaled, thereby saving signaling overhead.

Figure 12:
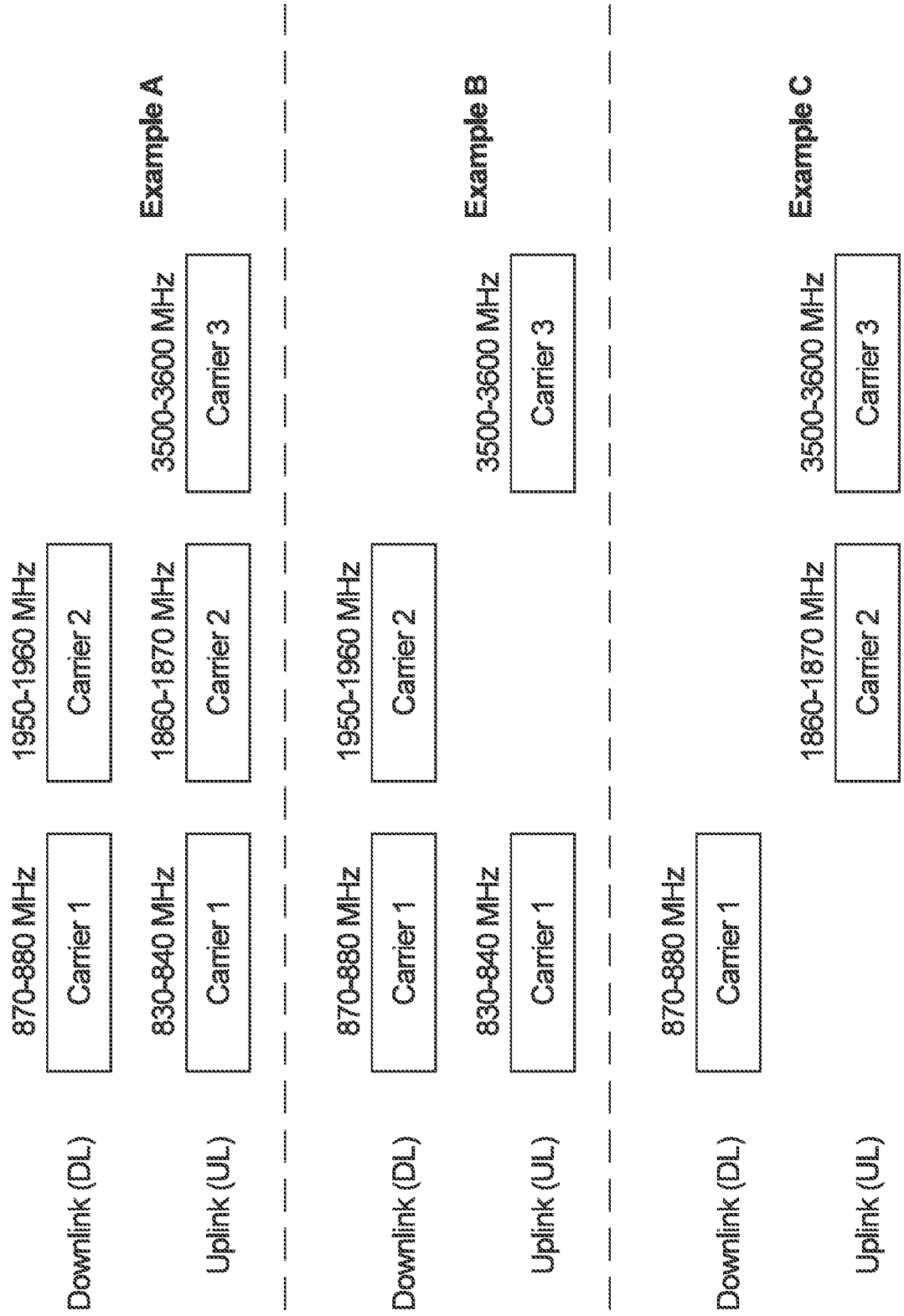
FIG. 12 illustrates flexible downlink/uplink spectrum selection for a UE, according to different examples.

An example of independent carrier/BWP addition/removal will be illustrated for the sake of example. In the example, there are three available downlink spectrums for use by base station 170 for communicating in the downlink: 870-880 MHz, 1950-1960 MHz, and 3500-3600 MHz. Each downlink spectrum may possibly be associated with a respective carrier and/or BWP. There are also three available uplink spectrums for use by base station 170 for receiving uplink communications from UEs: 830-840 MHz, 1860-1870 MHz, and 3500-3600 MHz. Each uplink spectrum may possibly be associated with a respective carrier and/or BWP. Carrier addition/removal will be assumed in the example, although BWP addition/removal could be implemented additionally or instead. FIG. 12 illustrates flexible downlink/uplink spectrum selection for UE 110, according to different examples. Other UEs 110 could be assigned different combinations of spectrums compared to UE 110. In Example A of FIG. 12, the UE 110 is configured to communicate on three carriers: Carriers 1, 2, and 3. Each carrier may additionally be activated for the UE 110. Carrier 1 is configured for downlink transmissions on downlink spectrum 870-880 MHz, and is configured for uplink transmissions on uplink spectrum 830-840 MHz. Carrier 2 is configured for downlink transmissions on downlink spectrum 1950-1960 MHz, and is configured for uplink transmissions on uplink spectrum 1860-1870 MHz. Carrier 3 is only configured for uplink transmissions, and is on uplink spectrum 3500-3600 MHz. In Example B of FIG. 12, the UE 110 is reconfigured to modify Carrier 2 so that it is only a downlink carrier, and that carrier remains on downlink spectrum 1950-1960 MHz. In Example C of FIG. 12, the UE 110 is reconfigured such that Carrier 1 is only a downlink carrier on downlink spectrum 870-880 MHz, Carrier 2 is only an uplink carrier on uplink spectrum 1860-1870 MHz, and Carrier 3 is only an uplink carrier on uplink spectrum 3500-3600 MHz. In the examples in FIG. 12, there might or might not be PUCCH groups. For example, in Example A of FIG. 12 it could be a single PUCCH group with one of the uplink carriers (e.g. uplink carrier 1) configured for sending UCI.

In some embodiments, a carrier/BWP may be added for a UE, but the communication direction might not be configured at the same time the carrier/BWP is added. The communication direction may alternatively be referred to as the transmission direction because it is the direction in which transmission occurs. The communication direction may be configured later, e.g. dynamically in physical layer control signaling (e.g. in DCI) or semi-statically, e.g. in RRC signaling or in a MAC CE. In some embodiments, the communication direction may be configured dynamically, and may change over time. In some embodiments, at the time of scheduling a transmission for a UE 110 on a carrier/BWP assigned to that UE 110, the communication direction is configured dynamically, e.g. in DCI. For example, the base station 170 configures UE 110 for communication on carrier A, e.g. by listing carrier A in the "CarrierToAddModList" for UE 110 in RRC signaling. However, the communication direction is not configured for carrier A. Then, at a later time, the base station 170 transmits DCI to UE 110 that schedules an uplink transmission for UE 110 on carrier A. The DCI also indicates that carrier A is for uplink transmission, at least for that scheduled transmission. In some embodiments, the indication of communication direction may be implicit, e.g. an uplink transmission scheduled on a carrier/BWP acts as an indication that the carrier/BWP communication direction is uplink, at least for that transmission.

In some embodiments, a carrier/BWP may be added for a UE, e.g. via RRC signaling or a MAC CE, and then later the communication direction and/or function of the carrier/BWP may be indicated. The later indication may be dynamic (e.g. in physical layer control information, such as DCI) or semi-static (e.g. in RRC signaling or a MAC CE). For example, the later indication may indicate that the carrier is a downlink carrier, or an uplink carrier, or a sidelink and/or unlicensed carrier (e.g. for transmission or reception on the sidelink or unlicensed carrier), etc. It may also or instead be indicated whether the UE is to communicate on the carrier using FD, TDD, or FDD. The communication direction or function may be changed over time.

Flexible Linkage

In some embodiments, multiple carriers and/or BWPs may be linked or paired, which will be referred to as "linkage". If there is linkage between two carriers and/or BWPs, then it may mean that transmission on one carrier/BWP is associated with another transmission on the other linked carrier/BWP. For example, DCI in one carrier/BWP schedules an uplink transmission, and the scheduled uplink transmission is sent in the other linked carrier/BWP. As another example, HARQ feedback for data sent in one carrier/BWP is sent in the linked carrier/BWP. A carrier/BWP may be linked to itself, e.g. for TDD, Full Duplex (FD), unlicensed transmission. A FDD downlink carrier/BWP may be linked to a FDD uplink carrier/BWP. A TDD downlink carrier/BWP may be linked to a supplementary uplink carrier/BWP. An uplink licensed carrier/BWP may be linked to a downlink unlicensed carrier/BWP. A downlink carrier in 6 GHz may be linked to an uplink carrier in 3.5 GHz.

In some embodiments, flexible linkage between carriers and/or BWPs may be possible. A configured linkage may be UE-specific.

For example, in some embodiments, there is no higher-layer (e.g. RRC) configuration of a linkage between two carriers or two BWPs. Instead, DCI indicates any linkage dynamically. For example, DCI transmitted in a downlink carrier may schedule an uplink transmission, and the DCI may also indicate the uplink carrier to use for the uplink transmission, e.g. by the DCI indicating a carrier index number that uniquely identifies the uplink carrier. As another example, DCI transmitted in a downlink carrier may schedule a downlink transmission, and the DCI may also indicate the uplink carrier to use for sending the HARQ feedback for the downlink transmission.

In some embodiments, there may be one or multiple downlink carriers/BWPs and one or multiple uplink carriers/BWPs configured for a UE, and for each downlink and uplink carrier and/or BWP, the base station 170 assigns a respective index, e.g. which allows the base station 170 to uniquely identify each carrier/BWP. For example, the indices may allow for the base station 170 to dynamically or semi-statically indicate which carriers or BWPs are linked, e.g. by indicating the index or indices of the linked carriers/BWPs. Example ways to assign carrier and BWP indices are explained earlier.

In some embodiments, for downlink scheduling and/or for downlink reference signal transmission (e.g. for CSI-RS transmission/measurement), the base station 170 may indicate, to the UE 110, the downlink carrier index and/or downlink BWP index in the DCI. The index tells the UE 110 the carrier/BWP of the downlink transmission. For uplink scheduling, and/or for transmission of uplink control information (e.g. for PUCCH transmission), and/or for uplink reference signal transmission (e.g. for SRS transmission), the base station 170 may indicate, to the UE 110, the uplink carrier index and/or BWP index in the DCI. The index tells the UE 110 the carrier/BWP on which the uplink transmission is sent. In some embodiments, if the DCI indicates that a current scheduled transmission is a retransmission, then the DCI may also indicate the carrier index and/or BWP index of the carrier/BWP that had a related previous transmission (e.g. the initial transmission). The previous transmission may be related in that it is part of the same HARQ process as the retransmission.

Figure 13:
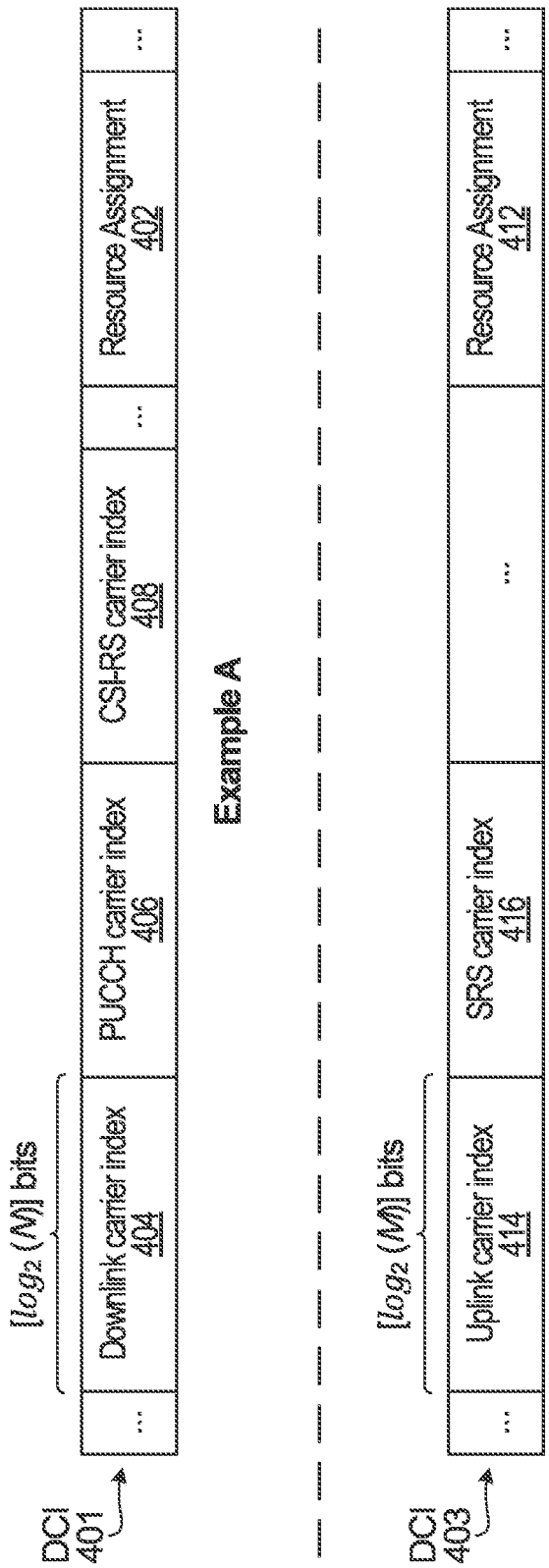
FIGS. 13 to 15 illustrate linkage between a scheduling carrier and a scheduled carrier, according to various examples

In one example, the base station 170 configures and activates, for UE 110, N downlink carriers and M uplink carriers, where N and M are integers greater than or equal to zero, and in general N might or might not equal M. The configuration and activation may be performed using semi-static signaling, e.g. in RRC signaling or in a MAC CE, or the activation may be dynamic, e.g. in DCI. FIG. 13 illustrates example fields in DCI, according to various embodiments. In Example A of FIG. 13, fields of DCI 401 are illustrated for scheduling a downlink transmission. The DCI 401 includes one or more fields for resource assignment 402, e.g. which specify the time-frequency resource and/or transmission parameters (e.g. MCS) for the scheduled downlink transmission. The DCI 401 further includes a downlink carrier index field 404, which is $\lceil \log_2(N) \rceil$ bits in length, and which uniquely identifies the downlink carrier on which the downlink transmission is scheduled. The DCI 401 further includes a PUCCH carrier index 406, which uniquely identifies the uplink carrier on which uplink control information (e.g. HARQ feedback) is to be sent for the scheduled downlink transmission. The DCI 401 further includes a CSI-RS carrier index 408 that indicates the carrier on which a CSI-RS is to be transmitted. Not all of the fields may be present, e.g. the CSI-RS carrier index field 408 might not be present. In some embodiments, if the downlink carrier index 404 field is not present, then the downlink transmission is scheduled on the same carrier on which the DCI 401 is received and decoded. In some embodiments, if the PUCCH carrier index 406 is not present, then the HARQ feedback or other uplink control information is transmitted on an uplink carrier previously designated (e.g. an uplink carrier paired with the downlink carrier on which the DCI 401 is sent). Other fields may be present in DCI 401, but have been omitted for ease of explanation. In Example B of FIG. 13, fields of DCI 403 are illustrated for scheduling an uplink transmission. The DCI 403 includes one or more fields for resource assignment 412, e.g. which specify the time-frequency resource and/or transmission parameters (e.g. MCS) for the scheduled uplink transmission. The DCI 403 further includes an uplink carrier index field 414, which is $\lceil \log_2(M) \rceil$ bits in length, and which uniquely identifies the uplink carrier on which the uplink transmission is scheduled. The DCI 403 further includes a SRS carrier index 416 that indicates the uplink carrier on which a SRS is to be transmitted. Not all of the fields may be present, e.g. the SRS carrier index field 416 might not be present. In some embodiments, if the uplink carrier index 414 field is not present, then the scheduled uplink transmission is transmitted on an uplink carrier previously designated (e.g. an uplink carrier paired with the downlink carrier on which the DCI 403 is sent). Other fields may be present in DCI 403, but have been omitted for ease of explanation. Also, in some embodiments, DCI 401 and 403 may be the same DCI, e.g. a DCI with a unified single format having all of the fields illustrated.

In some embodiments, the carrier/BWP on which a downlink transmission is scheduled may be different from the carrier/BWP used to send the DCI scheduling that downlink transmission. The downlink carrier index 404 illustrated in Example A of FIG. 13 may indicate the downlink carrier/BWP on which the downlink transmission is scheduled. In some embodiments, the base station 170 may configure, for UE 110, the linkage between: (i) the carrier/BWP on which the UE 110 is to monitor for DCI that schedules a downlink transmission, and (ii) the one or more carriers/BWPs on which the scheduled downlink data transmission is to be received. Similarly, the base station 170 may configure, for UE 110, the linkage between: (i) the carrier/BWP on which the UE 110 is to monitor for DCI that schedules an uplink transmission, and (ii) the one or more carriers/BWPs on which the scheduled uplink data transmission is to be sent.

Figure 14:
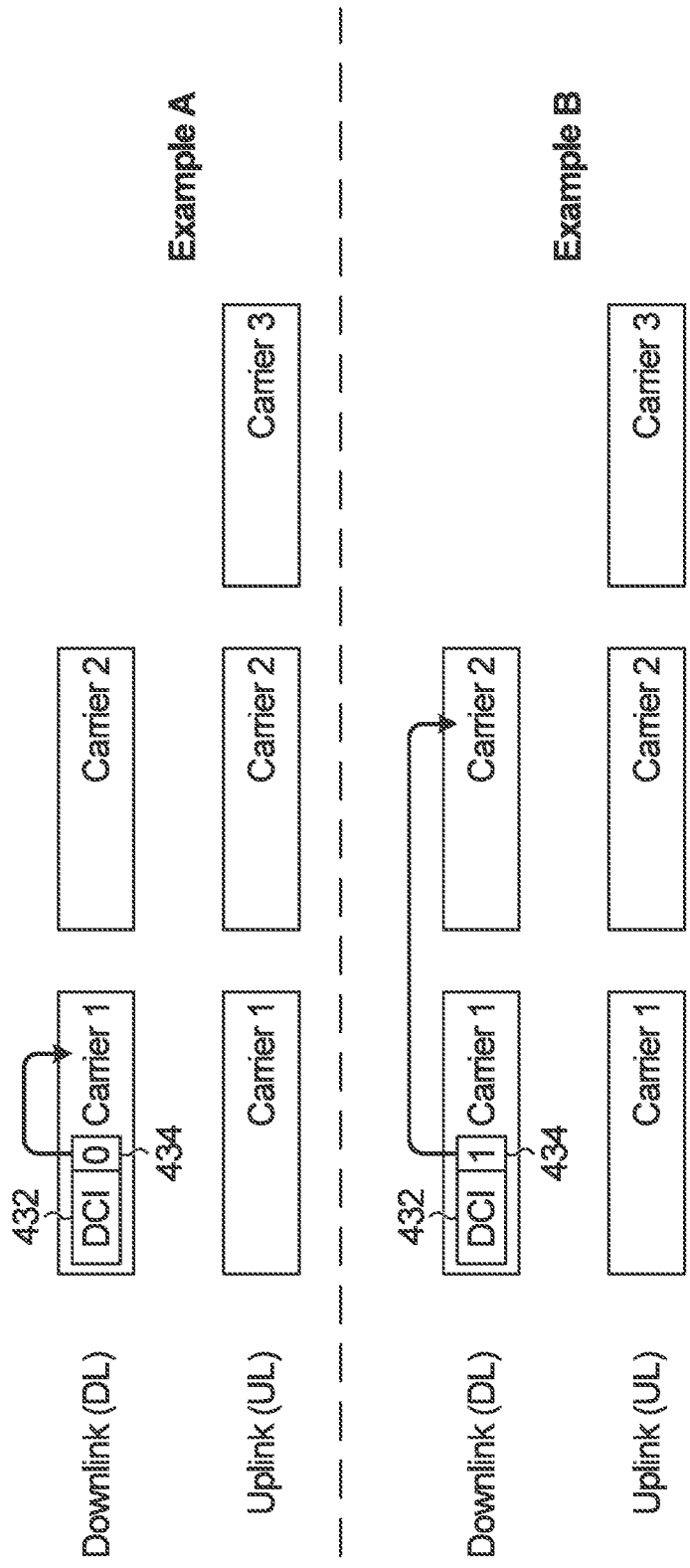
Figure 15:
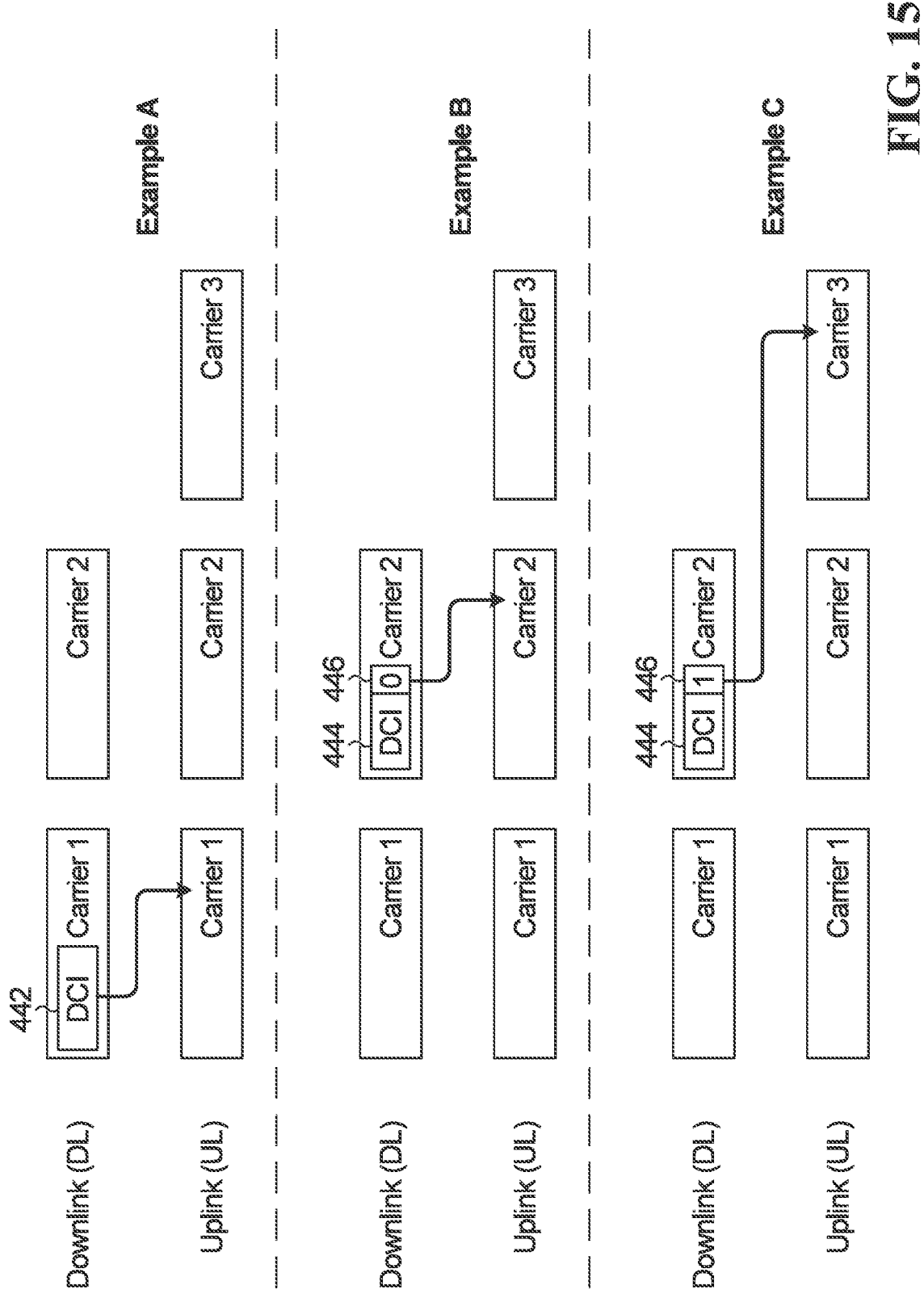

For example, FIGS. 14 and 15 illustrate linkage between a scheduling carrier and a scheduled carrier, according to various examples. As shown in FIG. 14, two downlink carriers labelled Carrier 1 and Carrier 2 are configured for UE 110. Three uplink carriers labelled Carrier 1, Carrier 2, and Carrier 3, are also configured for UE 110. Semi-static signaling (e.g. RRC signaling) or dynamic signaling (e.g. DCI) indicates, to UE 110, the following linkage for UE 110: (i) UE 110 is to monitor downlink Carrier 1 for DCI 432 scheduling downlink transmissions, and (ii) any downlink transmission scheduled by DCI 432 will be scheduled in either downlink Carrier 1 or downlink Carrier 2, as indicated by a downlink carrier index 434 in the DCI 432. The downlink carrier index 434 may be the same as downlink carrier index 404 in FIG. 13. The downlink carrier index 434 is a field in the DCI 432 that is one bit long because it only indicates one of two carriers: a bit value of zero indicates downlink Carrier 1, and a bit value of one indicates downlink Carrier 2. In Example A of FIG. 14, DCI 432 is received scheduling a downlink transmission in Carrier 1. In Example B of FIG. 14, DCI 432 is received scheduling a downlink transmission in Carrier 2.

With reference to FIG. 15, semi-static signaling (e.g. RRC signaling) or dynamic signaling (e.g. DCI) also indicates, to UE 110, the following additional linkage for UE 110: (i) UE 110 is to monitor downlink Carrier 1 for DCI 442 scheduling an uplink transmission, and if an uplink transmission is scheduled in DCI 442, then the uplink transmission is in uplink Carrier 1; (ii) UE 110 is to monitor downlink Carrier 2 for DCI 444 scheduling an uplink transmission, and if an uplink transmission is scheduled in DCI 444, then the uplink transmission will be scheduled in either uplink Carrier 2 or uplink Carrier 3, as indicated by an uplink carrier index 446 in DCI 444. The uplink carrier index 446 may be the same as uplink carrier index 414 in FIG. 13. Uplink carrier index 446 is a field in the DCI 444 that is one bit long because it only indicates one of two carriers: a bit value of zero indicates uplink Carrier 2, and a bit value of one indicates uplink Carrier 3. DCI 442 does not have an uplink carrier index field because there is only one uplink carrier (Carrier 1) on which the uplink transmission can be scheduled. Alternatively, it may be said that DCI 442 has an uplink carrier index field of bit length zero. In Example A of FIG. 15, DCI 442 is received scheduling an uplink transmission, which is to be sent on uplink Carrier 1, as per the configured linkage. In Example B of FIG. 15, DCI 444 is received scheduling an uplink transmission to be sent in Carrier 2. In Example C of FIG. 15, DCI 444 is received scheduling an uplink transmission to be sent in Carrier 3.

Note that in general DCI 432 and 442 could be the same DCI (e.g. a single DCI format) with one or more appropriate fields indicating the downlink or uplink carrier on which the transmission is scheduled. Similarly, DCI 442 and DCI 444 may be a DCI of the same format. Also, as is clear from FIGS. 14 and 15, the DCI scheduling a downlink transmission and the DCI scheduling an uplink transmission might possibly be carried in different carriers/BWPs. For example, for Carrier 2, the DCI scheduling a downlink transmission in Carrier 2 is in Carrier 1 (as shown in Example B of FIG. 14) and the DCI scheduling an uplink transmission in Carrier 2 is in Carrier 2 (as shown in Example B of FIG. 15).

In some embodiments, semi-static signaling (e.g. higher layer signaling, such as RRC signaling, or a MAC CE) configures downlink and uplink linkage between carriers/BWPs. For example, RRC signaling may link a downlink carrier index to one or multiple uplink carrier indices, or vice versa. As an example, RRC signaling may specify that downlink carrier N is linked to uplink carrier M1, or that downlink carrier N is linked to uplink carrier M1 and uplink carrier M2, or that downlink carrier N1 and downlink carrier N2 are linked to uplink carrier M, etc. Then, for example, if there is DCI in a downlink carrier that schedules or controls an uplink transmission, the uplink transmission occurs in the linked uplink carrier. The same may also apply to linked BWPs. In some embodiments, for an uplink grant in DCI, if no uplink carrier/BWP index is indicated, the uplink transmission is to be performed on the linked uplink carrier/BWP. In some embodiments, for HARQ feedback in relation to a downlink transmission, if no uplink carrier/BWP index is indicated, then the UE transmits the feedback on the linked uplink carrier/BWP.

In some embodiments, one downlink carrier/BWP can be linked to one or multiple uplink carriers/BWPs, and the link may be implicit based on predefined rules. For example, a downlink carrier and uplink carrier having the same carrier index may be linked.

In some embodiments, when a downlink carrier is linked to one uplink carrier, the uplink scheduling information sent in the downlink carrier is for the linked uplink carrier, and the uplink control information (UCI) feedback information (e.g. HARQ feedback) sent in the uplink carrier is for the linked downlink carrier. In some embodiments, when a downlink carrier is linked to more than one uplink carrier, the base station 170 indicates which one of the uplink carriers is to be used to send an uplink transmission scheduled via DCI transmitted on the downlink carrier. The uplink carrier may be indicated by specifying the carrier index in RRC signaling, a MAC CE, or in DCI. In some embodiments, when multiple downlink carriers are linked to one uplink carrier, the UCI (e.g. feedback information, such as HARQ feedback) for any one, some, or all of the downlink carriers is sent in the uplink carrier. For example, if for UE 110 downlink carriers N1 and N2 are both linked to uplink carrier M1, then HARQ feedback is transmitted on uplink carrier M1 for any downlink transmission received by UE 110 in the PDSCH in downlink carrier N1 and/or in downlink carrier N2.

In some embodiments, the UE 110 determines its uplink transmission power as a function of downlink pathloss, and the downlink carrier carrying the downlink reference signal used to determine the downlink pathloss may be flexibly configured. For example, an uplink carrier may be decoupled from a downlink carrier, i.e. no linkage between the uplink carrier and a downlink carrier. The UE 110 transmits on the uplink carrier with a particular uplink transmission power. The uplink transmission power may be a function of pathloss measured using a downlink reference signal on a downlink carrier. The downlink reference signal may be, for example, a CSI-RS. In some embodiments, the UE 110 receives, from the base station 170, an indication of which downlink carrier carries the downlink reference signal to be used for determining the downlink pathloss. The base station 170 may change, over time, the downlink carrier carrying the downlink reference signal. In some embodiments, the base station 170 explicitly indicates the downlink carrier carrying the downlink reference signal, e.g. by indicating a carrier index of the downlink carrier. The indication may be indicated semi-statically (e.g. in RRC signaling or a MAC CE), or the indication may be indicated dynamically (e.g. in DCI). In other embodiments, the base station 170 implicitly indicates the downlink carrier carrying the downlink reference signal, e.g. by indicating which downlink carrier is linked to the uplink carrier. The linked downlink carrier is then assumed by the UE 110 to carry the downlink reference signal for determining the downlink path loss.

Adding/Removing Function Independently for Each Carrier/BWP

In some embodiments, a carrier/BWP may be configured for performing a particular function, e.g. a carrier/BWP may be configured to be dedicated for performing measurement, or data transmission/reception, or control information transmission/reception, etc. Each carrier/BWP may be independently configured for a respective function, and the configuration may change over time. The configuration may be UE-specific or for a group of UEs. Adding or removing functionality associated with a carrier/BWP may be performed independently on each carrier/BWP.

For example, in some embodiments, a particular carrier and/or BWP may be configured for measurement. A carrier/BWP that is configured for measurement is sometimes alternatively referred to as being configured for a measurement function. A carrier/BWP that is configured for measurement means that it is configured for transmission of a signal that is used to measure the quality of the carrier/BWP, e.g. for radio resource management (RRM). The measurement may be a channel measurement, e.g. used to obtain information about the channel.

In one example, a downlink carrier/BWP (or at least a carrier/BWP having downlink resources) is used by the base station 170 to transmit, to the UE 110, a reference signal or a synchronization signal. An example of a reference signal is a CSI reference signal (CSI-RS). An example of a synchronization signal is a PSS and/or a SSS in a SSB. The reference signal and/or synchronization signal is used by the UE 110 to perform a measurement and thereby obtain a measurement result. Examples of possible measurements include: measuring CSI, such as information related to scattering, fading, power decay and/or signal-to-noise ratio (SNR) in the channel; and/or measuring signal-to-interference-plus-noise ratio (SINR), which is sometimes instead called signal-to-noise-plus-interference ratio (SNIR); and/or measuring Reference Signal Receive Power (RSRP); and/or measuring Reference Signal Receive Quality (RSRQ). The result of the measurement is the measurement result, e.g. the measurement result may be the measured SNR, SINR, RRSP, and/or RSRQ. A measurement report is then transmitted from the UE 110 to the base station 170. In some embodiments, the measurement report might also be transmitted on a carrier/BWP configured for measurement, e.g. possibly in uplink resources on the same carrier/BWP on which the reference signal or synchronization signal was transmitted in the downlink. The measurement report reports some or all of the measurement result. The measurement result may be used by the base station 170 to perform RRM. As an example, if the measurement result indicates that the downlink carrier/BWP is of too low quality, then the base station 170 may deactivate the downlink carrier/BWP for the UE 110.

In another example, an uplink carrier/BWP (or at least a carrier/BWP having uplink resources) is used by the UE 110 to transmit a reference signal, e.g. a sounding reference signal (SRS). The reference signal is used by the base station 170 to perform a measurement and thereby obtain a measurement result. The measurement result may be used by the base station 170 to perform RRM. As an example, if the measurement result indicates that the uplink carrier/BWP is of too low quality, then the base station 170 may deactivate the uplink carrier/BWP for the UE 110.

In some embodiments, not every carrier/BWP is configured for measurement. Instead, the measurement result from one carrier/BWP may be used as (or as the basis for) a measurement result in another carrier/BWP. The carrier/BWP configured to be used for measurement may be referred to as a "reference carrier" or "reference BWP". In some embodiments, measurement is only performed on the reference carrier(s)/BWP(s), not other carriers/BWPs. The measurement results on the reference carrier/BWP are then applied to other carriers/BWPs. Having a dedicated reference carrier/BWP, with the measurement results being applied to other carriers/BWPs for a UE 110 may save overhead, which is a technical benefit over prior schemes (e.g. in NR or LTE) in which measurement is independently performed on each carrier.

In some embodiments, if a carrier/BWP is not configured for measurement, then it could be that no reference signal is transmitted on the carrier/BWP. However, in some embodiments it could instead be that a reference signal is still transmitted, but just not used for performing a measurement.

In some embodiments, semi-static signaling (e.g. higher-layer signaling, such as RRC signaling, or a MAC CE) configures a particular carrier/BWP for a measurement function, e.g. for RRM measurement. In some embodiments, semi-static signaling (e.g. higher-layer signaling, such as RRC signaling, or a MAC CE) configures other carriers/BWPs to follow the measurement result of the carrier/BWP configured for measurement. For example, for intra-band carrier aggregation, one reference carrier for RRM measurement may be enough. The other carriers may use the measurement result from the reference carrier, or the measurement results for the other carriers may be predicted from the measurement result of the reference carrier, e.g. using artificial intelligence (AI). For example, a trained machine learning algorithm may determine a measurement result for another intra-band carrier given the measurement result of the reference carrier. The overhead of measurement may thereby possibly be saved compared to performing measurement independently on each carrier/BWP. In some implementations, AI/machine learning (ML) may predict RSRP and/or RSRQ level for a carrier/BWP without inter-frequency measurement, or based on some measurements (e.g. from a reference carrier), and/or based on some UE assistance information.

In some embodiments, a measurement function is configured for a first carrier/BWP, and a measurement function is not configured for at least a different second carrier/BWP. The first and second carrier/BWPs may be intra band, although this is not necessary. In one example, the base station 170 uses the measurement result of the first carrier/BWP as the measurement result of the second carrier/BWP. For example, if the measurement result indicates that the first carrier/BWP is of low quality, then the base station 170 may also consider the second carrier/BWP to be of low quality and deactivate both the first carrier/BWP and the second carrier/BWP. In another example, the base station 170 sets the measurement result of the second carrier/BWP as the measurement result of the first carrier/BWP plus or minus a delta, where the delta may be a value that is predefined, configured, and/or determined, e.g. using AI or ML. In another example, a measurement event occurring in relation to the first carrier/BWP (e.g. based on the measurement result of the first carrier/BWP) may also be considered by the base station 170 to occur in relation to the second carrier/BWP. For example, if an event triggering condition is satisfied in/for the first carrier/BWP (e.g. quality drops above or below a particular threshold), then the same event triggering condition is also considered to be satisfied in/for the second carrier/BWP. Example events might include: Event A1 (Serving becomes better than threshold); and/or Event A2 (Serving becomes worse than threshold); and/or Event A3 (Neighbor becomes offset better than PCell/PSCell); and/or Event A4 (Neighbor becomes better than threshold); and/or Event A5 (PCell/PSCell becomes worse than threshold1 and neighbor becomes better than threshold2); and/or Event A6 (Neighbor becomes offset better than SCell); and/or Event B1 (Inter RAT neighbor becomes better than threshold); and/or Event B2 (PCell becomes worse than threshold1 and inter RAT neighbor becomes better than threshold2).

Different specific scenarios in the context of uplink and downlink are possible when configuring an implementation in which a measurement result on one carrier/BWP is followed for one or more other carriers/BWPs. In one example, when only downlink-based measurement is used, for a downlink carrier configured with a measurement function, the base station and/or UE uses the measurement result on that downlink carrier for RRM of that downlink carrier. For another downlink or uplink carrier not configured with a measurement function, the base station configures a reference downlink carrier, and the measurement result of the reference downlink carrier is used for RRM for the carrier not configured with a measurement function. In another example, when only uplink-based measurement is used, for an uplink carrier configured with measurement function, the base station and/or UE uses the measurement result on that uplink carrier for RRM for that uplink carrier. For another uplink or downlink carrier not configured with measurement function, the base station configures a reference uplink carrier, and the measurement result of the reference uplink carrier is used for RRM for the carrier not configured with a measurement function. In another example, when both downlink-based and uplink-based measurement is used, for the downlink/uplink carrier configured with a measurement function, the base station/UE uses the measurement result on that carrier for RRM of that carrier. For another carrier not configured with measurement function, the base station configures a reference carrier, and the measurement result of the reference carrier is used for RRM for the carrier not configured with the measurement function.

Figure 16:
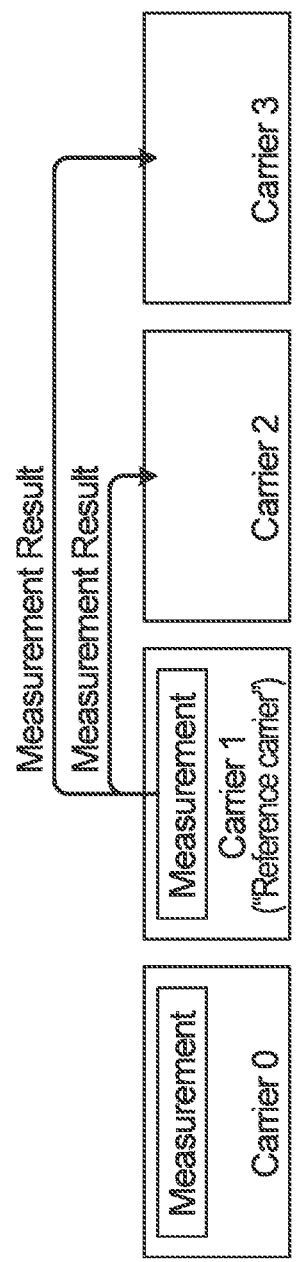
FIG. 16 illustrates the use of measurement results from a reference carrier, according to one embodiment.

FIG. 16 illustrates the use of measurement results from a reference carrier, according to one embodiment. Four carriers are illustrated, labelled Carrier 0, Carrier 1, Carrier 2, and Carrier 3. Carrier 0 is configured for measurement, and the base station/UE uses the measurement result on Carrier 0 for RRM for Carrier 0. Carrier 1 is also configured for measurement, and is referred to as a reference carrier because its measurement results are also used for Carrier 2 and Carrier 3, as illustrated. Carriers 2 and 3 are not configured for measurement. Instead, Carrier 2 and Carrier 3 each use the measurement result from reference Carrier 1.

The explanation above equally applies to BWPs. That is, a measurement result on one BWP or carrier may be used for another carrier and/or BWP not configured with a measurement function.

In some embodiments, a carrier/BWP may be configured for data transmission, data receiving, or both data transmitting and receiving. The configuration may be on a UE-specific basis, or for a group of UEs. For example, RRC signaling, a MAC CE, or DCI may indicate that a particular carrier/BWP is for: downlink transmission only, or uplink transmission only, or for both downlink and uplink transmission, or for SRS transmission, or for CSI-RS reception, or for sidelink transmission, or for sidelink reception, or for both sidelink transmission and reception, or for unlicensed spectrum transmission and/or reception, etc. Depending upon the configuration, the base station 170 may also indicate whether the carrier is for FDD communication, TDD communication, or FD communication, possibly along with an indication of any parameters associated with the communication if not predefined (e.g. uplink and downlink frequency bands in FDD, switching gap between uplink and downlink in TDD, etc.).

In some embodiments, a carrier/BWP may be configured for only control information transmission and/or control channel monitoring. For example, semi-static signaling (e.g. RRC signaling or a MAC CE) may configure a carrier/BWP in a Secondary Carrier Group for radio link failure (RLF) monitoring (e.g. to perform a similar function as the PSCell in NR). As another example, semi-static signaling (e.g. RRC signaling or a MAC CE) may configure a carrier/BWP to be used by the UE 110 for monitoring a downlink control channel for physical layer downlink control signaling (e.g. for PDCCH monitoring). As another example, semi-static signaling (e.g. RRC signaling or a MAC CE) may configure a carrier/BWP to be used by the UE 110 for transmitting uplink control information (UCI), e.g. for providing PUCCH feedback.

In some embodiments in which a carrier has one or more BWPs (e.g. like in FIG. 7), there may be dynamic carrier and BWP indication. For example, DCI indicates the carrier index and BWP index for data transmission, retransmission, control information transmission (e.g. on a PUCCH), SRS transmission, etc. Alternatively, in some embodiments, the DCI indicates the carrier index, but the BWP index used in the carrier is predefined or configured semi-statically (e.g. RRC configured in RRC signaling). For example, the BWP index for data transmission, retransmission, control information transmission (e.g. on a PUCCH), SRS transmission, etc. may be predefined or configured semi-statically in higher-layer signaling. In some embodiments, the DCI indicates the BWP index to be used, and the carrier index and BWP index are jointly numbered, such that when the base station 170 indicates the BWP index to the UE 110, the UE 110 knows the carrier index. The vice versa may also be implemented, e.g. the DCI indicates the carrier index to be used, and based on the carrier index the UE 110 knows which BWP index to use in the carrier. In some embodiments, the DCI indicates the carrier/BWP index that is scheduled, and also indicates the number of transmit/receive RF chains (e.g. number of antennas for transmission and reception) for that scheduled carrier/BWP.

Turning On/Off RF

A UE uses radio frequency (RF) components to implement wireless communication. Some RF components may instead be called analog components. Examples of RF components may include one or more of the following: antennas, and/or antenna arrays, and/or power amplifiers, and/or filters, and/or frequency up-convertors, and/or frequency down-convertors, and/or analog-to-digital convertors (ADCs), and/or digital-to-analog convertors (DACs). To implement a wireless communication, a set of RF components are arranged in a particular order to form an RF chain to transmit and/or receive the wireless communication. An RF chain may be a receive RF chain (i.e. an RF chain to receive a wireless communication) or a transmit RF chain (i.e. an RF chain to transmit a wireless communication). A particular group of RF components may be configured as a receive RF chain, a transmit RF chain, or both a receive and transmit RF chain, and a UE may possibly change the configuration.

A UE may indicate to the base station 170, e.g. in a capability report, the number of carriers the UE can use for wireless communication. The number of carriers indicated in the capability report is typically commensurate with the RF capability of the UE, e.g. commensurate with the number of available RF chains on the UE. For example, if the RF components of UE 110 can only support a maximum of two carriers, then the capability report indicates that the UE 110 can support communication on up to two carriers.

In some embodiments, the number of added and/or activated carriers for a UE, e.g. the number of carriers configured for UE 110 in a carrier group, may be larger than the capability of the UE. For example, during or after initial access, UE 110 may send a capability report to the base station 170 in which the UE 110 indicates that the carrier aggregation capability of the UE 110 is to support an aggregation of maximum two downlink carriers and one uplink carrier. However, there may be four available downlink carriers and four available uplink carriers for use by the base station 170. The base station 170 might therefore add and/or activate more than two downlink carriers and/or more than one uplink carrier for the UE 110 to allow for flexible utilization of spectrum resources at base station 170. Then, during operation, the base station 170 instructs RF switching to communicate on only maximum two downlink carriers and maximum one uplink carrier at a time to stay within UE capabilities.

How the RF switching is performed is implementation specific. In one example, an RF chain is switched to communicate on a different carrier by modifying one or more parameters of the RF components (e.g. modifying the up-conversion frequency).

RF switching to no longer communicate on a carrier will be referred to as "turning the RF off" for the carrier. RF switching to allow for communication on another carrier will be referred to as "turning the RF on" for the carrier. In some embodiments, semi-static signaling (e.g. RRC signaling or MAC CE) or dynamic signaling (e.g. DCI) may indicate which carriers are to have their RF turned on/off. A "source carrier" is a carrier having its RF on, but that is to have its RF turned off so that the RF components can instead be used to turn on a "destination carrier".

In one example, each carrier may be uniquely identified by a carrier index, and the DCI may indicate a source carrier index that is to have its RF turned off and a destination carrier index that is to have its RF turned on. In one example, DCI scheduling a downlink transmission additionally indicates "source carrier index=2" and "destination carrier index=3", which the UE 110 interprets to mean that the RF corresponding to carrier index 2 (e.g. Carrier 2) is to be turned off and the RF corresponding to carrier index 3 (e.g. Carrier 3) is to be turned on. The UE 110 then implements RF switching to configure the RF components for communication on carrier index 3 instead of carrier index 2.

In some embodiments, the base station 170 may instruct RF switching from one carrier to another (e.g. in DCI as indicated above), in order to switch between the different carriers. In this way, flexibility may be increased because the UE 110 may be configured for transmission and/or reception on a larger set of carriers exceeding the capability of the UE 110, with the base station switching among the carriers (via RF switching) in order to select carriers for communication that best suit the scenario, e.g. that have available transmission time-frequency resources.

Figure 17:
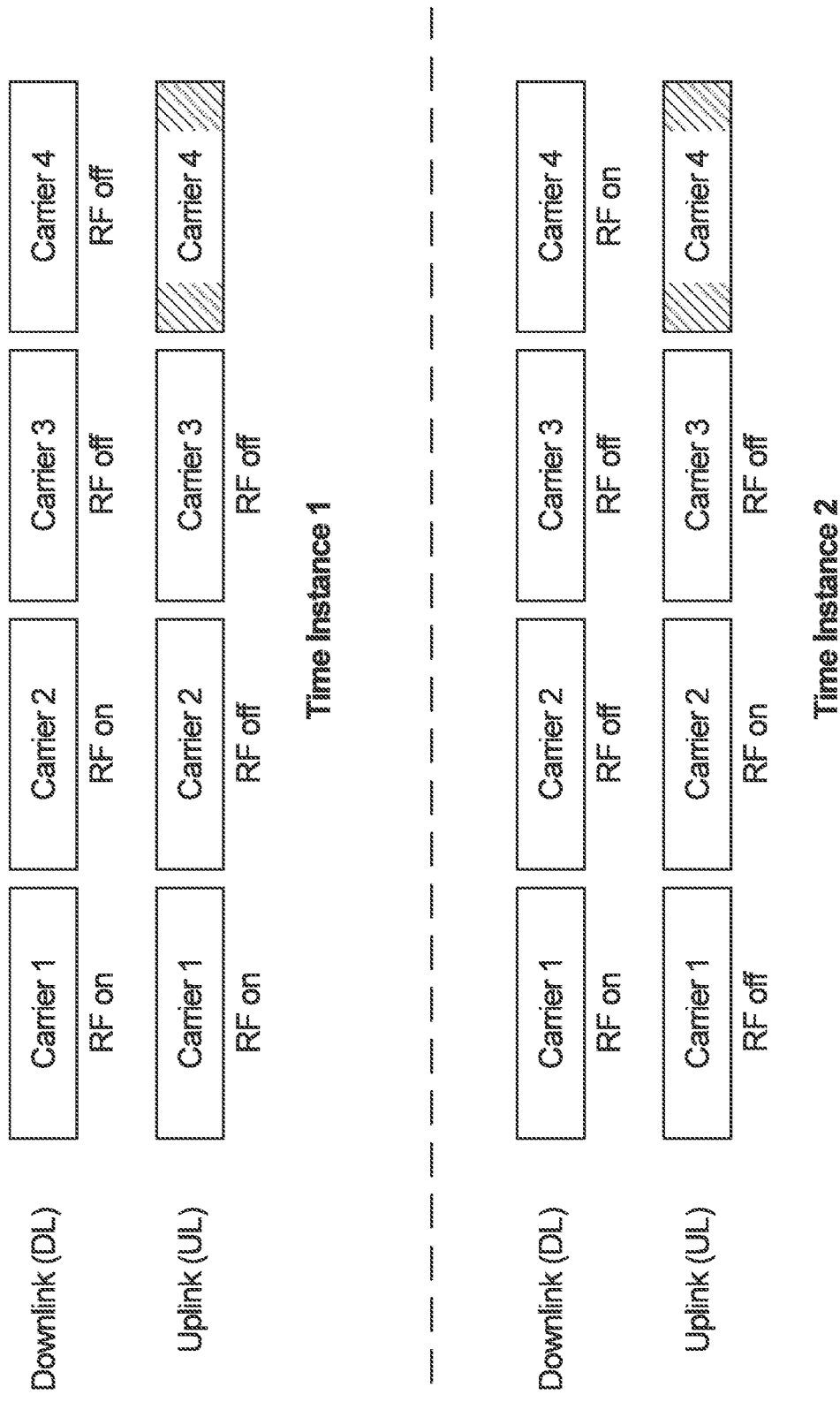
FIG. 17 illustrates downlink and uplink carriers activated for a UE, according to one embodiment.

As an example, FIG. 17 illustrates downlink and uplink carriers activated for UE 110, according to one embodiment. The UE 110 only supports communication with the base station 170 on maximum two downlink carriers and one uplink carrier. However, the base station 170 has the ability to communicate on up to four uplink carriers and up to four downlink carriers. In FIG. 17, the base station 170 has activated all four downlink carriers and three of the four uplink carriers for the UE 110. Only uplink carrier 4 shown in hatching is not activated. The UE 110 is ready for transmission/reception on each activated carrier. However, the UE 110 cannot communicate on all of the activated carriers at the same time because of the RF capability limitations of the UE 110. Therefore, the base station 170 instructs turning on and off the RF corresponding to different carriers so that the number of carriers on which transmission/reception may occur is within the number of carriers supported by the UE 110. At time instance 1 of FIG. 17, downlink carriers 1 and 2 and uplink carrier 1 have their RF turned on and ready for transmission/reception. At time instance 2 of FIG. 17, downlink carriers 1 and 4 and uplink carrier 2 have their RF turned on and ready for transmission/reception.

The discussion above equally applies BWPs. For example, the number of added and/or activated BWPs for a UE, e.g. the number of BWPs configured for UE 110 in a carrier, carrier group, or BWP group, may be larger than the capability of the UE 110. Turning on/off the RF for different BWPs may be implemented to ensure that the number of BWPs on which the UE 110 communicates at any one time stays within the capabilities of the UE 110.

BWP Switching

Figure 18:
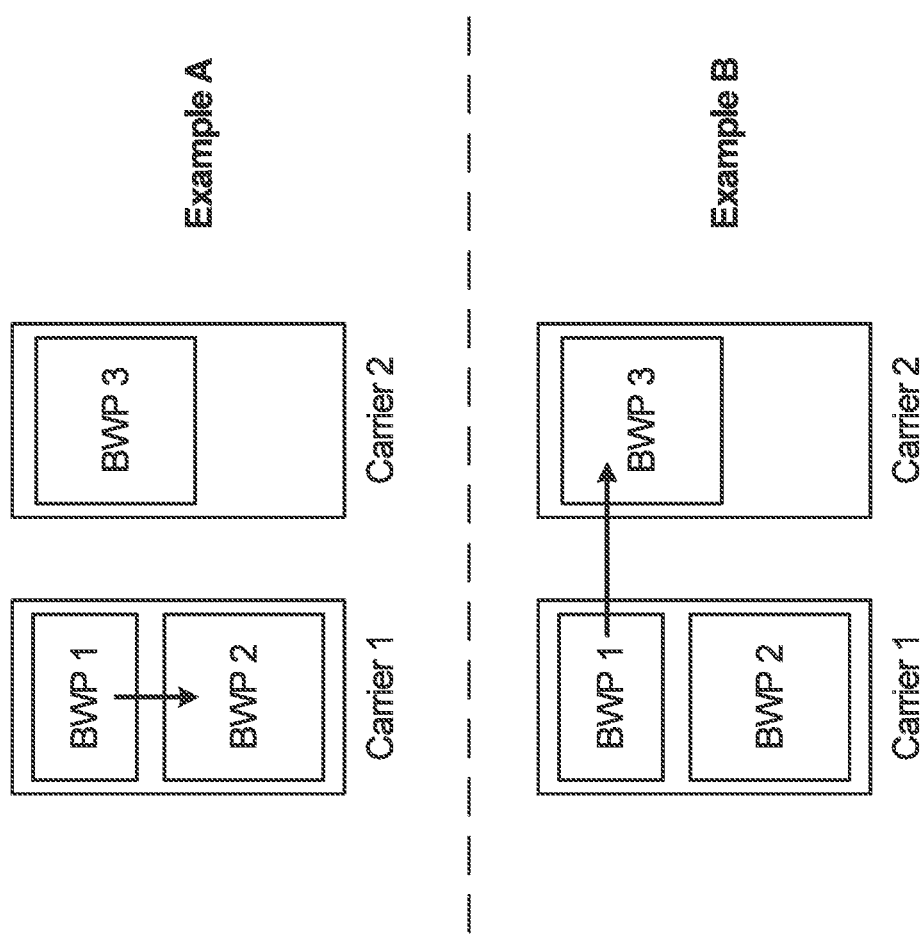
FIG. 18 illustrates active BWP switching, according to one embodiment.

In some embodiments, a carrier may have one or more BWPs, and BWP switching may be implemented. The BWP switching may be dynamic, e.g. in physical layer control signaling, such as in DCI. For example, DCI may indicate that the active BWP is switched, and the active BWP may be switched to another BWP in the same carrier or in a different carrier. For example, FIG. 18 illustrates active BWP switching, according to one embodiment. UE 110 is configured to communicate on two carriers labelled Carrier 1 and Carrier 2. Carrier 1 includes two BWPs labelled BWP 1 and BWP 2. Carrier 2 includes a single BWP labelled BWP 3. Example A of FIG. 18 illustrates an example in which BWP 1 is activated, but DCI is received by UE 110, and the DCI instructs the UE 110 to instead activate BWP 2. That is, before switching BWP 1 is activated and BWP 2 is deactivated, and after switching BWP 1 is deactivated and BWP 2 is activated. Example B of FIG. 18 illustrates an example in which BWP 1 is activated, but DCI is received by UE 110, and the DCI instructs the UE 110 to instead activate BWP 3. That is, before switching BWP 1 is activated and BWP 3 is deactivated, and after switching BWP 1 is deactivated and BWP 3 is activated. Because BWP 3 is on a different carrier than BWP 1, the RF chain (transmit RF chain or receive RF chain) may also be switched to the carrier having BWP 3, as necessary. By switching between the two carriers, the UE 110 may have more flexible use of carrier resources in order to improve throughput or reduce latency. In one example, Carrier 1 may be for delay tolerant communication (e.g. Enhanced Mobile Broadband (eMBB) communication), and Carrier 2 may be for low latency communication (e.g. ultra reliable low latency communication (URLLC)). If, for example, the UE 110 is to send or receive low latency data, the active BWP may be switched to BWP 3 to have an immediately available time-frequency resource to send or receive the transmission.

EXAMPLE METHODS

Figure 19:
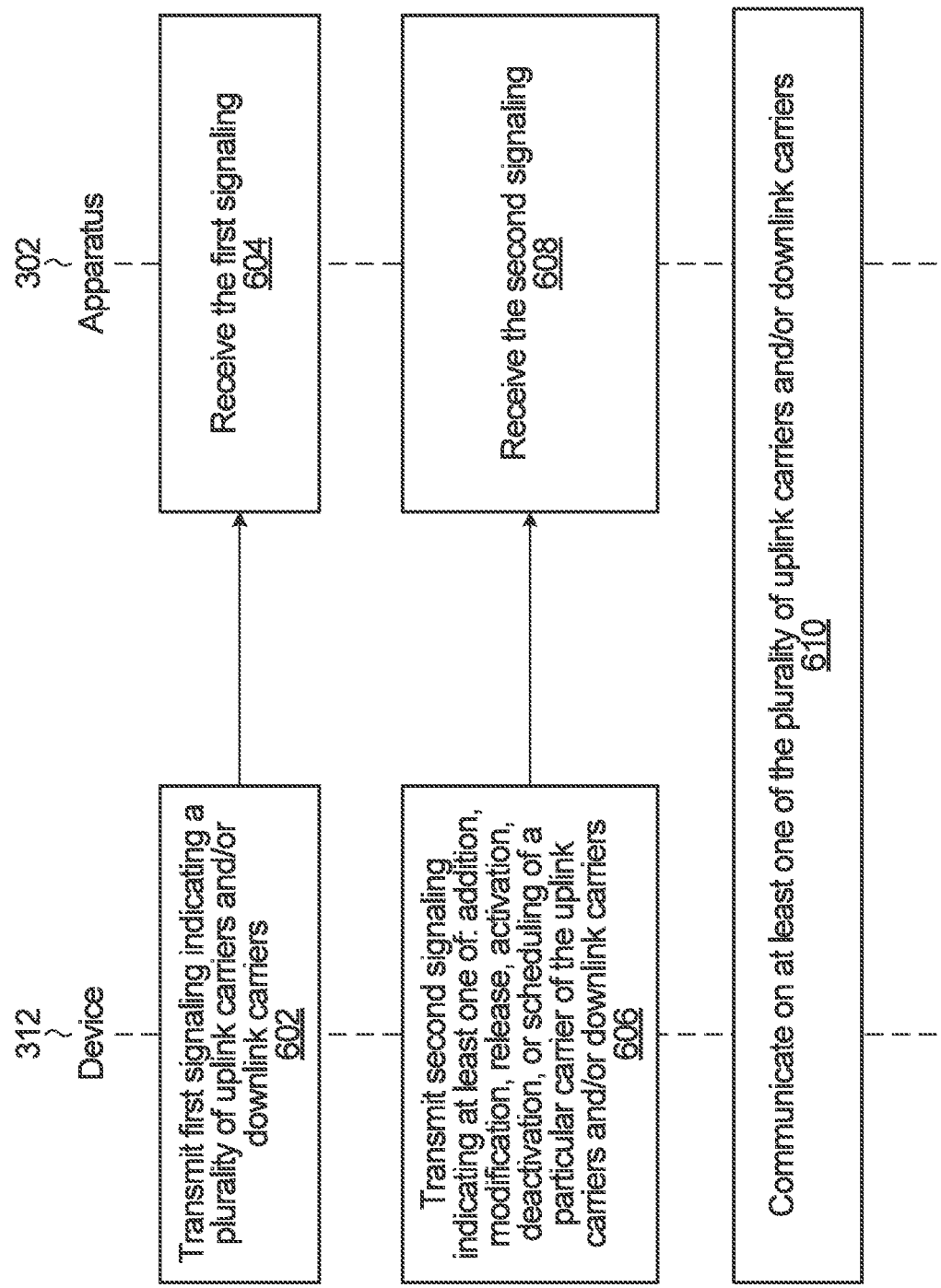
FIG. 19 illustrates a method performed by an apparatus and a device, according to one embodiment.

FIG. 19 illustrates a method performed by apparatus 302 and device 312, according to one embodiment. The apparatus 302 may be a UE, e.g. UE 110, although not necessarily. The device 312 may be a network device, e.g. base station 170, although not necessarily.

At step 602, the device 312 transmits first signaling indicating a plurality of uplink carriers and/or downlink carriers. In some embodiments, the first signaling indicates candidate uplink and/or downlink carriers, that is, the plurality of uplink carriers and/or downlink carriers may be or include candidate uplink and/or downlink carriers. The candidate uplink and/or downlink carriers may have been selected by the device 312 for the apparatus 302 from all possible carriers. However, the first signaling does not necessarily add or activate any of those carriers (although it might, depending upon the implementation). At step 604, the apparatus 302 receives the first signaling. An ID of the uplink and/or downlink carriers indicated in the first signaling may be stored in the memory of the apparatus 302. At step 606, the device 312 transmits second signaling indicating at least one of: addition, modification, release, activation, deactivation, or scheduling of a particular carrier of the uplink carriers and/or downlink carriers. The second signaling might be semi-static (e.g. RRC signaling or MAC CE) or dynamic (e.g. in DCI). At step 608, the apparatus 302 receives the second signaling. At step 610, the apparatus 302 and the device 312 communicate on at least one of the plurality of uplink carriers and/or downlink carriers.

In the method of FIG. 19, decoupling of an uplink and downlink carrier may be possible, e.g. by adding, modifying, releasing, activating, deactivating, or scheduling an uplink carrier and not necessarily a downlink carrier, or by adding, modifying, releasing, activating, deactivating, or scheduling a downlink carrier and not necessarily an uplink carrier. More flexibility is thereby provided.

In some embodiments, each of the plurality of uplink carriers and/or downlink carriers are associated with a respective carrier index/value. In some embodiments, the device 312 (or another device, e.g. on the network) indicates, to the apparatus 302, which carrier index is associated with each carrier. The indication may be provided in the form of a mapping. In some embodiments, the mapping is predefined and does not need to be signaled. In other embodiments, the mapping needs to be signaled to the apparatus 302. In some embodiments, the mapping is stored in memory of the apparatus 302, e.g. in the form of a look up table. In such embodiments, when the apparatus 302 receives an indication of a carrier index, the apparatus 302 can use the mapping in memory to determine which carrier corresponds to that carrier index. The same equally applies in relation to BWP indices.

In some embodiments, an uplink carrier and a downlink carrier occupying a same spectrum are associated with either a same carrier index or a different carrier index. Occupying a same spectrum may mean having the same carrier frequency (e.g. center frequency) and/or having the same bandwidth. Alternatively, an uplink carrier and a downlink carrier may be in different spectrum, e.g. having different carrier frequencies (e.g. different center frequencies) and/or different bandwidths. In some embodiments, when the uplink carrier and the downlink carrier are in different spectrums, the uplink carrier and the downlink carrier may be in different spectrums in a same frequency band, or different spectrums in different frequency bands. In some embodiments, in duplex mode the two frequency bands could be the same or different. In some embodiments, the downlink carrier could be in a FDD/TDD/SDL (Supplemental Downlink)/unlicensed/full duplex band, and/or the uplink carrier could be in a FDD/TDD/SUL (Supplemental Uplink)/unlicensed/full duplex band.

Some embodiments are now set forth from the perspective of the apparatus 302.

In some embodiments, the uplink carrier and the downlink carrier occupying the same spectrum are associated with the same carrier index, and the method of FIG. 19 further includes: receiving at least one message configuring the spectrum for one of the uplink carrier or the downlink carrier; and applying the configuration to the other of the uplink carrier or the downlink carrier. In this way, signaling overhead may be saved by only having to signal the configuration of spectrum for either the uplink or downlink carrier, not both.

In some embodiments, the method of FIG. 19 may include receiving at least one message configuring linkage between a downlink carrier and at least one of the plurality of uplink carriers. In this way, flexible linkage between carriers may be possible, thereby providing more flexibility. Examples are described earlier, e.g. in relation to FIGS. 12 to 15, and any details of those examples described earlier may be implemented. In some embodiments, the at least one message configures linkage between the downlink carrier and a particular uplink carrier, and the method may further include: receiving, on the downlink carrier, information scheduling an uplink transmission; and transmitting the uplink transmission on the particular uplink carrier. In some embodiments, the at least one message configures linkage between the downlink carrier and a particular uplink carrier, and the method may further include: receiving a downlink transmission on the downlink carrier; and transmitting HARQ feedback corresponding to the downlink transmission on the particular uplink carrier.

In some embodiments, the method of FIG. 19 may include receiving information scheduling an uplink transmission, the information also indicating a particular one of the uplink carriers on which the uplink transmission is scheduled and/or a particular one of the uplink carriers on which a reference signal is to be transmitted. In some embodiments, the method of FIG. 19 may include receiving information scheduling a downlink transmission, the information also indicating a particular one of the uplink carriers on which HARQ feedback corresponding to the downlink transmission is to be transmitted. In some embodiments, the method of FIG. 19 may include receiving information scheduling a downlink transmission, the information also indicating a particular one of the downlink carriers on which the downlink transmission is scheduled and/or a particular one of the downlink carriers on which a reference signal is to be received. Examples related to the embodiments in this paragraph are described earlier, e.g. in relation to FIGS. 13 to 15, and any details of those examples described earlier may be implemented.

In some embodiments, the method of FIG. 19 may include: receiving an indication indicating that a particular downlink carrier carries a downlink reference signal used for downlink pathloss estimation for uplink transmission power control on an uplink carrier; and transmitting an uplink transmission on the uplink carrier, the uplink transmission having a transmission power that is based on the downlink pathloss estimated from the downlink reference signal received on the particular downlink carrier.

In some embodiments, a first carrier of the plurality of uplink carriers and/or downlink carriers is not configured for measurement, and the method of FIG. 19 may further include receiving an indication that a second carrier of the plurality of uplink carriers and/or downlink carriers is configured for measurement. In some such embodiments, the method of FIG. 19 may further include: receiving a reference signal and/or a synchronization signal in a downlink transmission on the second carrier; and performing a measurement using the reference signal and/or the synchronization signal to obtain a measurement result. RRM for the first carrier may possibly be based on the measurement result. In this way, signaling overhead relating to measurement may possibly be reduced, e.g. because the first carrier is not configured for measurement. Examples are described earlier, e.g. in relation to FIG. 16, and any details of those examples described earlier may be implemented.

In some embodiments, the apparatus 302 is configured to communicate on a set of carriers including some or all of the plurality of uplink carriers and/or downlink carriers. In some embodiments, each carrier in the set of carriers includes at least one BWP. In some embodiments, the set of carriers includes a first carrier and a second carrier, and the method of FIG. 19 may include: receiving at least one message indicating that a first BWP on the first carrier is to be deactivated and that a second BWP on the second carrier is to be activated; and deactivating the first BWP and activating the second BWP. Examples are described earlier, e.g. in relation to FIG. 18, and any details of those examples described earlier may be implemented. In some embodiments, the method of FIG. 19 may include performing RF switching to communicate on the second BWP of the second carrier. Examples relating to RF switching are described earlier, e.g. in relation to FIG. 17, and any details of those examples described earlier may be implemented.

Some embodiments are now set forth from the perspective of the device 312.

In some embodiments, the uplink carrier and the downlink carrier occupying the same spectrum are associated with the same carrier index, and the method of FIG. 19 may further include: transmitting at least one message configuring the spectrum for one of the uplink carrier or the downlink carrier, where the configuration also applies to the other of the uplink carrier or the downlink carrier.

In some embodiments, the method of FIG. 19 may include transmitting at least one message configuring linkage between a downlink carrier and at least one of a plurality of uplink carriers. Examples are described earlier, e.g. in relation to FIGS. 12 to 15, and any details of those examples described earlier may be implemented. In some embodiments, the at least one message configures linkage between the downlink carrier and a particular uplink carrier, and the method of FIG. 19 may include: transmitting, on the downlink carrier, information scheduling an uplink transmission; and receiving the uplink transmission on the particular uplink carrier. In some embodiments, the at least one message configures linkage between the downlink carrier and a particular uplink carrier, and the method of FIG. 19 may further include: transmitting a downlink transmission on the downlink carrier; and receiving HARQ feedback corresponding to the downlink transmission on the particular uplink carrier.

In some embodiments, the method of FIG. 19 may include transmitting information scheduling an uplink transmission, the information also indicating a particular one of the uplink carriers on which the uplink transmission is scheduled and/or a particular one of the uplink carriers on which a reference signal is to be transmitted from the apparatus 302. In some embodiments, the method of FIG. 19 may include transmitting information scheduling a downlink transmission, the information also indicating a particular one of the uplink carriers on which HARQ feedback corresponding to the downlink transmission is to be transmitted from the apparatus 302. In some embodiments, the method of FIG. 19 may include transmitting information scheduling a downlink transmission, the information also indicating a particular one of the downlink carriers on which the downlink transmission is scheduled and/or a particular one of the downlink carriers on which a reference signal is to be received by the apparatus 302. Examples related to the embodiments in this paragraph are described earlier, e.g. in relation to FIGS. 13 to 15, and any details of those examples described earlier may be implemented.

In some embodiments, the method of FIG. 19 may include transmitting an indication indicating that a particular downlink carrier carries a downlink reference signal used for downlink pathloss estimation for uplink transmission power control on an uplink carrier; and receiving an uplink transmission on the uplink carrier, the uplink transmission having a transmission power that is based on the downlink pathloss estimated from the downlink reference signal transmitted on the particular downlink carrier.

In some embodiments, a first carrier of the plurality of uplink carriers and/or downlink carriers is not configured for measurement. In some embodiments, the method of FIG. 19 may include transmitting an indication that a second carrier of the plurality of uplink carriers and/or downlink carriers is configured for measurement. In some embodiments, the method of FIG. 19 may include: transmitting a reference signal and/or a synchronization signal in a downlink transmission on the second carrier; and receiving a measurement result from the apparatus 302. In some such embodiments, RRM for the first carrier may be based on the measurement result. Examples are described earlier, e.g. in relation to FIG. 16, and any details of those examples described earlier may be implemented.

In some embodiments, the device 312 is configured to communicate on a set of carriers including some or all of the plurality of uplink carriers and/or downlink carriers. In some embodiments, each carrier in the set of carriers may include at least one BWP. In some embodiments, the set of carriers includes a first carrier and a second carrier, and the method of FIG. 19 may include transmitting at least one message indicating that a first BWP on the first carrier is to be deactivated and that a second BWP on the second carrier is to be activated. Examples are described earlier, e.g. in relation to FIG. 18, and any details of those examples described earlier may be implemented.

Other methods are possible. For example, in some embodiments, a method is performed by an apparatus during an initial access procedure. The method may include: performing downlink synchronization using a synchronization signal; receiving an indication of a plurality of uplink carriers and/or uplink BWPs; selecting, from the plurality of uplink carriers and/or uplink BWPs, a particular uplink carrier and/or uplink BWP for transmitting an uplink transmission during the initial access procedure; transmitting the uplink transmission on the particular uplink carrier and/or uplink BWP.

As another example, in some embodiments, a method is performed by an apparatus including: receiving an indication that a particular carrier and/or BWP is configured for measurement; subsequently receiving a reference signal and/or a synchronization signal in a downlink transmission on the particular carrier and/or BWP; performing a measurement using the reference signal and/or the synchronization signal to obtain a measurement result; transmitting the measurement result to the device, where the measurement result is used for RRM for both the particular carrier and/or BWP and another carrier and/or BWP.

As another example, in some embodiments, a method is performed by an apparatus including: receiving an indication of a set of carriers and/or BWPs for use for communicating with a device; receiving a message that indicates a subset of the carriers and/or BWPs for which radio frequency (RF) communication is to be configured; performing RF switching to configure RF communication on each of the subset of carriers and/or BWPs; communicating with the device on the subset of carriers and/or BWPs.

As another example, in some embodiments, a method is performed by an apparatus including: receiving information scheduling a communication, where the information includes an indication of a particular carrier and/or BWP on which the communication is scheduled; and performing the communication on the particular carrier and/or BWP.

Examples of an apparatus 302 and a device 312 to perform the various methods described herein are also disclosed.

The apparatus 302 may include a memory to store processor-executable instructions, and a processor to execute the processor-executable instructions. When the processor executes the processor-executable instructions, the processor may be caused to perform the method steps of the apparatus 302 as described above, e.g. in relation to FIG. 19. As an example, the processor may receive the first signaling and the second signaling. As another example, the processor may cause the apparatus 302 to communicate with the device 312 using at least one of the plurality of uplink carriers and/or downlink carriers, e.g. by receiving downlink transmissions from a downlink carrier and decoding such transmissions, and by preparing uplink transmissions for transmission on an uplink carrier (e.g. by performing baseband processing, such as encoding, etc.) and instructing transmission on an RF chain associated with the uplink carrier. In some embodiments, the apparatus 302 may be a circuit chip. In some embodiments, the apparatus 302 may be a UE, in which case the apparatus may also have a receiver for receiving transmissions and/or a transmitter for sending transmissions.

The device 312 may include a memory to store processor-executable instructions, and a processor to execute the processor-executable instructions. When the processor executes the processor-executable instructions, the processor may be caused perform the method steps of the device 312 as described above, e.g. in relation to FIG. 19. As an example, the processor may generate the first signaling and the second signaling and output the first signaling and the second signaling (e.g. at the output of the processor). The first signaling and the second signaling may be for transmission, e.g. to apparatus 302. The processor may cause and/or instruct the transmission. Causing the transmission may include generating the transmission, e.g. performing baseband processing, such as encoding. Instructing the transmission may include outputting a message configuring the RF chain to transmit the transmission. The processor may cause the device 312 to communicate with the apparatus 302 on at least one of the plurality of uplink carriers and/or downlink carriers, e.g. by receiving uplink transmissions from an uplink carrier and decoding such transmissions, and by preparing downlink transmissions for transmission on a downlink carrier (e.g. by performing baseband processing, such as encoding, etc.) and instructing transmission on an RF chain associated with the downlink carrier. In some embodiments, the device 312 may be a circuit chip. In some embodiments, the device 312 may be a network device, e.g. a base station, in which case the device 312 may also have a transmitter for transmitting the transmissions and/or a receiver for receiving transmissions.

In some embodiments, a flexible spectrum configuration may be provided, e.g. allowing for more flexible configuration of carriers and/or BWPs, possibly on a UE-specific basis, e.g. in order to try to enable a more personalized spectrum requirement for each UE. In some embodiments, a more unified carrier/BWP concept may be provided that may resolve different confusing concepts in LTE and NR (e.g. possibly avoiding the large different number of cell-related concepts used in previous implementations, such as PCell, SCell, MCG, SCG, PSCell, SpCell, etc.). In some embodiments, there may be multiple connectivity (including DC) configuration. In some embodiments, there may be more flexible spectrum utilization for initial access, e.g. a UE may perform initial access with minimal capability (e.g. in a low power or throughput mode) using a primary downlink carrier, and flexible candidate uplink carrier/BWP indication for initial access. In some embodiments, there is provided flexible spectrum utilization after initial access, e.g. a carrier adding/removing concept that may operate similar to previous schemes for both CA and DC, and/or individual carrier adding/removing signaling for downlink and uplink, and/or flexible linkage among carriers, and/or adding/removing different functions independently on carriers, e.g. configuring a carrier for measurement or for data transmission or receiving, or for control transmission or for control channel monitoring, etc.

In some embodiments, one or more limitations related to spectrum present in previous LTE and/or NR schemes may be overcome. For example, in previous implementations, there is not flexible carrier configuration, e.g. downlink and uplink carriers are linked to a cell, and there is not flexible linkage among carriers, whereas in some embodiments disclosed herein there is flexible carrier/BWP configuration with flexible linkage. In previous implementations, downlink and uplink carriers cannot be independently added or removed for a UE, whereas in some embodiments disclosed herein downlink and uplink carriers/BWPs may be independently added or removed for a UE. In previous implementations, there is RRM measurements for each cell without support for independent configuration of the carrier for measurement, whereas in some embodiments disclosed herein any carrier/BWP might or might not be configured for measurement, and some carriers/BWP might not be configured for measurement, instead using measurement results from or based on another carrier/BWP. In previous implementations, there is not flexible spectrum utilization during initial access, whereas in some embodiments disclosed herein there may be more flexible spectrum utilization during initial access, e.g. through the use of candidate uplink carriers as described herein. In previous implementations, there is not flexible DCI indication for the carrier indication, e.g. cross-carrier scheduling may only be supported, without dynamic indication of the carrier for data retransmission, PUCCH, and SRS. Whereas in some embodiments disclosed herein, there may be DCI indication of carriers and/or BWPs, and possible dynamic indication of a carrier and/or BWP for data transmission and/or for data retransmission and/or transmission of control information and/or for transmission of a reference signal (e.g. a SRS).

In some embodiments, there is provided independent configuration for the downlink and uplink carrier, enabling more flexible spectrum utilization for downlink and/or uplink. There may be provided more flexible downlink and/or uplink scheduling among carriers, thereby possibly improving the spectrum scheduling efficiency. There may be provided dynamic switching for CA/DC, e.g. independently dynamically indicating the scheduled carrier index for downlink and/or uplink, and/or dynamic and unified switching of BWPs within and among carriers.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by an apparatus, the method comprising:
  receiving first signaling indicating a plurality of uplink carriers and/or downlink carriers, wherein each of the plurality of uplink carriers and/or downlink carriers are associated with a respective carrier index, and wherein an uplink carrier and a downlink carrier occupying the same spectrum are associated with the same carrier index;
  receiving at least one message configuring the spectrum for one of the uplink carrier or the downlink carrier;

applying the configuration to the other of the uplink carrier or the downlink carrier; and receiving second signaling indicating at least one of: addition, modification, release, activation, deactivation, or scheduling of a particular carrier of the uplink carriers and/or downlink carriers.

2. The method of claim 1, further comprising receiving at least one message configuring linkage between a particular downlink carrier and at least one of the plurality of uplink carriers.

3. The method of claim 2, wherein the at least one message configures linkage between the particular downlink carrier and a particular uplink carrier, and wherein the method further comprises:

receiving, on the particular downlink carrier, information scheduling an uplink transmission; and transmitting the uplink transmission on the particular uplink carrier.

4. The method of claim 2, wherein the at least one message configures linkage between the particular downlink carrier and a particular uplink carrier, and wherein the method further comprises:

receiving a downlink transmission on the particular downlink carrier; and transmitting hybrid automatic repeat request (HARQ) feedback corresponding to the downlink transmission on the particular uplink carrier.

5. The method of claim 1, further comprising receiving information scheduling an uplink transmission, the information also indicating a particular one of the uplink carriers on which the uplink transmission is scheduled and/or a particular one of the uplink carriers on which a reference signal is to be transmitted.

6. The method of claim 1, further comprising receiving information scheduling a downlink transmission, the information also indicating a particular one of the uplink carriers on which HARQ feedback corresponding to the downlink transmission is to be transmitted.

7. The method of claim 1, further comprising receiving information scheduling a downlink transmission, the information also indicating a particular one of the downlink carriers on which the downlink transmission is scheduled and/or a particular one of the downlink carriers on which a reference signal is to be received.

8. The method of claim 1, further comprising:

receiving an indication indicating that a particular downlink carrier carries a downlink reference signal used for downlink pathloss estimation for uplink transmission power control on a particular uplink carrier; and transmitting an uplink transmission on the particular uplink carrier, the uplink transmission having a transmission power that is based on the downlink pathloss estimated from the downlink reference signal received on the particular downlink carrier.

9. The method of claim 1, wherein a first carrier of the plurality of uplink carriers and/or downlink carriers is not configured for measurement, and wherein the method further comprises receiving an indication that a second carrier of the plurality of uplink carriers and/or downlink carriers is configured for measurement.

10. The method of claim 9, further comprising:

receiving a reference signal and/or a synchronization signal in a downlink transmission on the second carrier; and performing a measurement using the reference signal and/or the synchronization signal to obtain a measurement result;

wherein radio resource management (RRM) for the first carrier is based on the measurement result.

11. The method of claim 1, wherein the apparatus is configured to communicate on a set of carriers including some or all of the plurality of uplink carriers and/or downlink carriers, wherein each carrier in the set of carriers includes at least one bandwidth part (BWP), wherein the set of carriers includes a first carrier and a second carrier, and wherein the method further comprises:

receiving at least one message indicating that a first BWP on the first carrier is to be deactivated and that a second BWP on the second carrier is to be activated; and deactivating the first BWP and activating the second BWP.

12. The method of claim 11, further comprising performing radio frequency (RF) switching to communicate on the second BWP of the second carrier.

13. A method performed by a device, the method comprising:

transmitting first signaling indicating a plurality of uplink carriers and/or downlink carriers, wherein each of the plurality of uplink carriers and/or downlink carriers are associated with a respective carrier index, and wherein an uplink carrier and a downlink carrier occupying a same spectrum are associated with a same carrier index;

transmitting at least one message configuring the spectrum for one of the uplink carrier or the downlink carrier, wherein the configuration also applies to the other of the uplink carrier or the downlink carrier;

transmitting second signaling indicating at least one of: addition, modification, release, activation, deactivation, or scheduling of a particular carrier of the uplink carriers and/or downlink carriers; and communicating with an apparatus on at least one of the plurality of uplink carriers and/or downlink carriers.

14. The method of claim 13, further comprising transmitting at least one message configuring linkage between a particular downlink carrier and at least one of the plurality of uplink carriers.

15. An apparatus comprising:

a processor; and a memory storing processor-executable instructions that, when executed, cause the processor to:

receive first signaling indicating a plurality of uplink carriers and/or downlink carriers, wherein each of the plurality of uplink carriers and/or downlink carriers are associated with a respective carrier index, and wherein an uplink carrier and a downlink carrier occupying a same spectrum are associated with a same carrier index;

receive at least one message configuring the spectrum for one of the uplink carrier or the downlink carrier;

apply the configuration to the other of the uplink carrier or the downlink carrier; and receive second signaling indicating at least one of: addition, modification, release, activation, deactivation, or scheduling of a particular carrier of the uplink carriers and/or downlink carriers.

16. The apparatus of claim 15, wherein the instructions, when executed, cause the processor to receive at least one message configuring linkage between a particular downlink carrier and at least one of the plurality of uplink carriers.

17. The apparatus of claim 16, wherein the at least one message configures linkage between the particular downlink carrier and a particular uplink carrier, and wherein the instructions, when executed, cause the processor to:

receive, on the particular downlink carrier, information scheduling an uplink transmission; and cause transmission of the uplink transmission on the particular uplink carrier.

18. A device comprising:
a processor; and
a memory storing processor-executable instructions that, when executed by the processor, cause the processor to:
output, for transmission, first signaling indicating a plurality of uplink carriers and/or downlink carriers, wherein each of the plurality of uplink carriers and/or downlink carriers are associated with a respective carrier index, and wherein an uplink carrier and a downlink carrier occupying a same spectrum are associated with a same carrier index;
output, for transmission, at least one message configuring the spectrum for one of the uplink carrier or the downlink carrier, wherein the configuration also applies to the other of the uplink carrier or the downlink carrier;
output, for transmission, second signaling indicating at least one of: addition, modification, release, activation, deactivation, or scheduling of a particular carrier of the uplink carriers and/or downlink carriers; and
cause the device to communicate with an apparatus on at least one of the plurality of uplink carriers and/or downlink carriers.

19. The device of claim 18, wherein the instructions, when executed, cause the processor to output, for transmission, at least one message configuring linkage between a particular downlink carrier and at least one of the plurality of uplink carriers.

20. The device of claim 19, wherein the at least one message configures linkage between the particular downlink carrier and a particular uplink carrier, and wherein the instructions, when executed, cause the processor to:
output, for transmission on the particular downlink carrier, information scheduling an uplink transmission; and
receive the uplink transmission on the particular uplink carrier.

* * * * *